United States Patent
Bai et al.

(10) Patent No.: US 12,464,388 B2
(45) Date of Patent: Nov. 4, 2025

(54) BEAM FAILURE DETECTION REFERENCE SIGNAL SET UPDATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 17/958,050

(22) Filed: Sep. 30, 2022

(65) Prior Publication Data

US 2024/0114366 A1  Apr. 4, 2024

(51) Int. Cl.
*H04W 24/08* (2009.01)
*H04L 5/00* (2006.01)

(52) U.S. Cl.
CPC ............. *H04W 24/08* (2013.01); *H04L 5/001* (2013.01); *H04L 5/0051* (2013.01)

(58) Field of Classification Search
None
See application file for complete search history.

(56) References Cited

U.S. PATENT DOCUMENTS

| | | |
|---|---|---|
| 2022/0109489 A1 | 4/2022 | Zhu et al. |
| 2022/0225135 A1 | 7/2022 | Cirik et al. |
| 2023/0199528 A1* | 6/2023 | Kang ................ H04W 24/08 370/328 |
| 2024/0098526 A1* | 3/2024 | Matsumura .......... H04L 5/0023 |
| 2024/0306015 A1* | 9/2024 | Matsumura .......... H04L 5/0053 |

FOREIGN PATENT DOCUMENTS

| | | |
|---|---|---|
| WO | WO-2021237558 A1 | 12/2021 |
| WO | WO-2022157819 A1 | 7/2022 |

OTHER PUBLICATIONS

International Search Report and Written Opinion—PCT/US2023/075137—ISA/EPO—Feb. 5, 2024.

* cited by examiner

*Primary Examiner* — Peter P Chau
(74) *Attorney, Agent, or Firm* — Holland & Hart LLP/Qualcomm Incorporated

(57) ABSTRACT

Methods, systems, and devices for wireless communications are described. A user equipment (UE) may receive an indication of one or more beam failure detection reference signal sets corresponding to a list of component carriers. Whether a component carrier is included in the list or whether a beam failure detection reference signal set of the one or more beam failure detection reference signal sets is applicable to the component carrier, or both, may be based on whether the component carrier is of a first type configured for a single beam failure detection reference signal set or is of a second type configured for multiple beam failure detection reference signal sets. The UE may monitor one or more component carriers included in the list for beam failure using the one or more indicated beam failure detection reference signal sets.

30 Claims, 12 Drawing Sheets

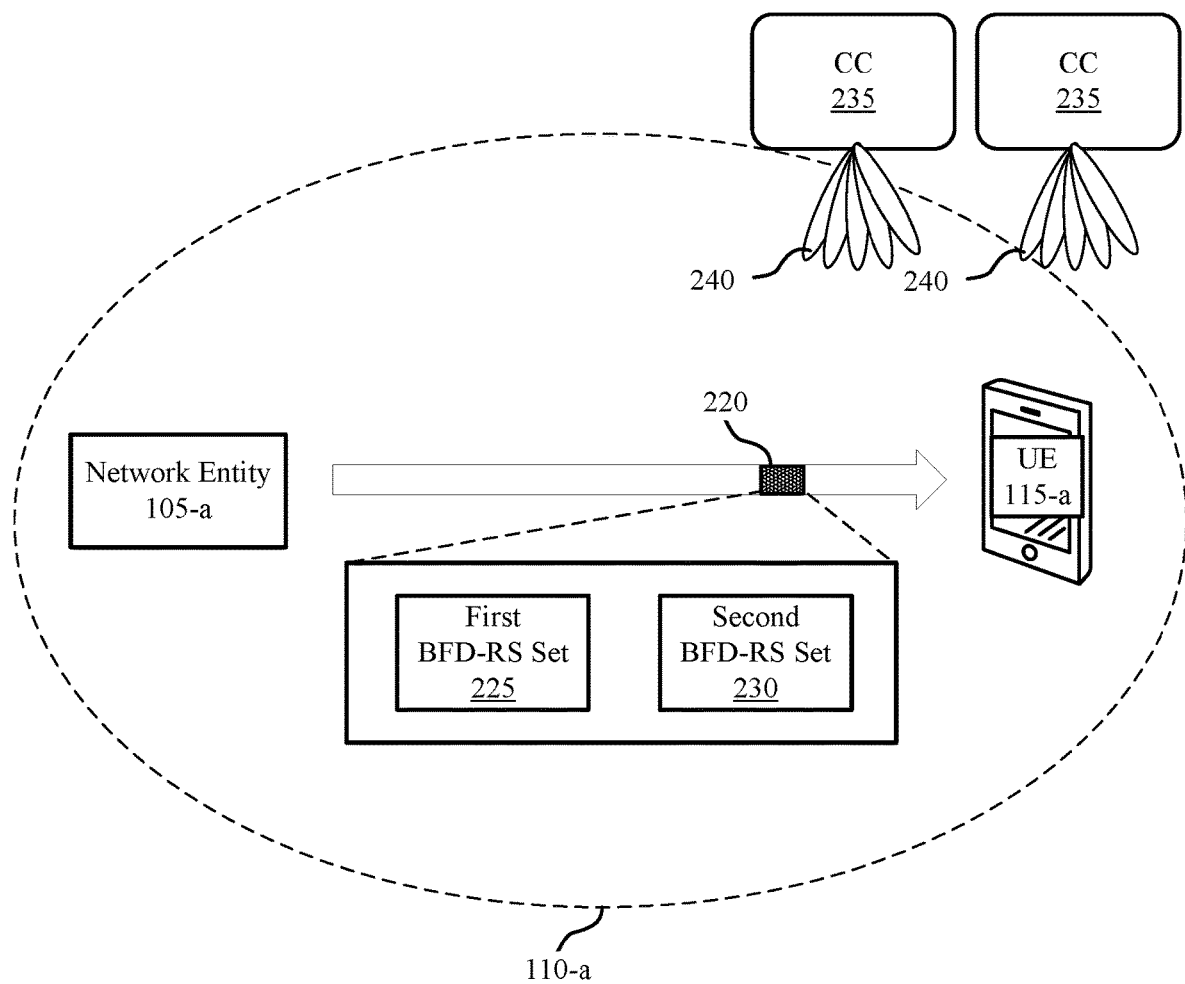
 BFD-RS Set Indication 220
FIG. 2

| CC List 320-a |
|---|
| CC0 – Single BFD-RS set |
| CC1 – Single BFD-RS set |
| CC2 – Single BFD-RS set |
| CC3 – Single BFD-RS set |
| CC4 – Single BFD-RS set |
| CC5 – Single BFD-RS set |
| CC6 – Single BFD-RS set |
| CC7 – Single BFD-RS set |

| CC List 320-b |
|---|
| CC0 – Dual BFD-RS set |
| CC1 – Dual BFD-RS set |
| CC2 – Dual BFD-RS set |
| CC3 – Dual BFD-RS set |
| CC4 – Dual BFD-RS set |
| CC5 – Dual BFD-RS set |
| CC6 – Dual BFD-RS set |
| CC7 – Dual BFD-RS set |

| CC List 320-c | MAC-CE 325-a<br>BFD-RS Set | MAC-CE 325-b<br>BFD-RS Set / BFD-RS Set |
|---|---|---|
| CC0 – Single BFD-RS set | Applicable | Not Applicable |
| CC1 – Dual BFD-RS set | Not Applicable | Applicable |
| CC2 – Dual BFD-RS set | Not Applicable | Applicable |
| CC3 – Single BFD-RS set | Applicable | Not Applicable |
| CC4 – Dual BFD-RS set | Not Applicable | Applicable |
| CC5 – Single BFD-RS set | Applicable | Not Applicable |
| CC6 – Dual BFD-RS set | Not Applicable | Applicable |
| CC7 – Single BFD-RS set | Applicable | Not Applicable |

| CC List 320-d | MAC-CE 325-c | |
|---|---|---|
| | First BFD-RS Set 330-a | Second BFD-RS Set 330-b |
| CC0 – Single BFD-RS set | First BFD-RS Set | |
| CC1 – Dual BFD-RS set | First BFD-RS Set | Second BFD-RS Set |
| CC2 – Dual BFD-RS set | First BFD-RS Set | Second BFD-RS Set |
| CC3 – Single BFD-RS set | First BFD-RS Set | |
| CC4 – Dual BFD-RS set | First BFD-RS Set | Second BFD-RS Set |
| CC5 – Single BFD-RS set | First BFD-RS Set | |
| CC6 – Dual BFD-RS set | First BFD-RS Set | Second BFD-RS Set |
| CC7 – Single BFD-RS set | First BFD-RS Set | |

BEAM FAILURE DETECTION REFERENCE SIGNAL SET UPDATE

FIELD OF TECHNOLOGY

The following relates to wireless communications, including beam failure detection reference signal set update.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may use a beam failure detection reference signal set for a beam failure detection process. However, such approaches may be improved.

SUMMARY

The described techniques relate to improved methods, systems, devices, and apparatuses that support beam failure detection reference signal set update. A user equipment (UE) may receive an indication of one or more beam failure detection reference signal sets corresponding to a list of component carriers. Whether a component carrier is included in the list or whether a beam failure detection reference signal set of the one or more beam failure detection reference signal sets is applicable to the component carrier, or both, may be based on whether the component carrier is of a first type configured for a single beam failure detection reference signal set or is of a second type configured for multiple beam failure detection reference signal sets. The UE may monitor one or more component carriers included in the list for beam failure using the one or more indicated beam failure detection reference signal sets.

A method for wireless communications at a user equipment (UE) is described. The method may include receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets, and monitoring one or more component carriers included in the list for beam failure using the one or more indicated beam failure detection reference signal sets.

An apparatus for wireless communication is described. The apparatus may include a memory, a transceiver, and at least one processor of a user equipment, the at least one processor coupled with the memory and the transceiver. The at least one processor may be configured to receive an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets, and monitor one or more component carriers included in the list for beam failure using the one or more indicated beam failure detection reference signal sets.

Another apparatus for wireless communications at a UE is described. The apparatus may include means for receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets, and means for monitoring one or more component carriers included in the list for beam failure using the one or more indicated beam failure detection reference signal sets.

A non-transitory computer-readable medium storing code for wireless communications at a UE is described. The code may include instructions executable by a processor to receive an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets, and monitor one or more component carriers included in the list for beam failure using the one or more indicated beam failure detection reference signal sets.

In some examples of the method, apparatuses, and non-transitory computer-readable medium described herein, the indication of one or more beam failure detection reference signal sets indicates multiple beam failure detection reference signal sets that correspond to the list of component carriers, and the method, apparatuses, and non-transitory computer-readable medium may include further operations, features, means, or instructions for identifying, based on the multiple beam failure detection reference signal sets being indicated by the indication, the multiple beam failure detection reference signal sets as applicable to each component carrier included in the list that may be of the second type configured for multiple beam failure detection reference signal sets, where the monitoring includes monitoring each component carrier included in the list that may be of the second type using each of the multiple beam failure detection reference signal sets based on the multiple beam failure detection reference signal sets being applicable to each component carrier included in the list that may be of the second type.

Some examples of the method, apparatuses, and non-transitory computer-readable medium described herein may further include operations, features, means, or instructions for identifying, based on the multiple beam failure detection reference signal sets being indicated by the indication, the indication of the multiple beam failure detection reference signal sets as inapplicable to each component carrier included in the list that may be of the first type configured for a single beam failure detection reference signal set.

In some examples of the method, apparatuses, and non-transitory computer-readable medium described herein, the indication of one or more beam failure detection reference signal sets indicates a single beam failure detection reference signal set that corresponds to the list of component carriers, and the method, apparatuses, and non-transitory computer-readable medium may include further operations, features, means, or instructions for identifying, based on the single beam failure detection reference signal set being indicated by the indication, the single beam failure detection reference signal set as applicable to each component carrier included in the list that may be of the first type configured for a single beam failure detection reference signal set, where the monitoring includes monitoring each component carrier included in the list that may be of the first type using the single beam failure detection reference signal set based on the single beam failure detection reference signal set being applicable to each component carrier included in the list that may be of the first type.

Some examples of the method, apparatuses, and non-transitory computer-readable medium described herein may further include operations, features, means, or instructions for identifying, based on the single beam failure detection reference signal set being indicated by the indication, the indication of the single beam failure detection reference signal set as inapplicable to each component carrier included in the list that may be of the second type configured for multiple beam failure detection reference signal sets.

In some examples of the method, apparatuses, and non-transitory computer-readable medium described herein, the indication of one or more beam failure detection reference signal sets indicates multiple beam failure detection reference signal sets that correspond to the list of component carriers, and the method, apparatuses, and non-transitory computer-readable medium may include further operations, features, means, or instructions for identifying, based on the multiple beam failure detection reference signal sets being indicated by the indication, that a first beam failure detection reference signal set of the multiple beam failure detection reference signal sets may be applicable to each of the component carriers of the first type configured for a single beam failure detection reference signal set, where the monitoring includes monitoring each component carrier included in the list that may be of the first type using the first beam failure detection reference signal set based on the first beam failure detection reference signal set being applicable to each component carrier included in the list that may be of the second type.

Some examples of the method, apparatuses, and non-transitory computer-readable medium described herein may further include operations, features, means, or instructions for identifying, based on the multiple beam failure detection reference signal sets being indicated by the indication, that the first beam failure detection reference signal set and a second beam failure detection reference signal set of the multiple beam failure detection reference signal sets may be both applicable to each of the component carriers of the second type configured for multiple beam failure detection reference signal sets, where the monitoring includes monitoring each component carrier included in the list that is of the second type using both the first beam failure detection reference signal set and the second beam failure detection reference signal set based on the first beam failure detection reference signal set and the second beam failure detection reference signal set both being applicable to each component carrier included in the list that is of the second type.

In some examples of the method, apparatuses, and non-transitory computer-readable medium described herein, the list includes only component carriers of the first type configured for the single beam failure detection reference signal set or only component carriers of the second type configured for multiple beam failure detection reference signal sets, the component carriers of the second type that may be included in the list each being configured for a same quantity of beam failure detection reference signal sets.

In some examples of the method, apparatuses, and non-transitory computer-readable medium described herein, the component carriers of the first type include component carriers configured for per-cell beam failure recovery, and where the component carriers of the second type include component carriers configured for per-transmission and reception point (TRP) beam failure recovery.

In some examples of the method, apparatuses, and non-transitory computer-readable medium described herein, the list of component carriers includes a list of component carriers for beam indications.

Some examples of the method, apparatuses, and non-transitory computer-readable medium described herein may further include operations, features, means, or instructions for receiving a second indication of one or more second beam failure detection reference signal sets corresponding to a second list of component carriers, where the second list of component carriers does not include any component carrier that may be included in the list of component carriers.

Some examples of the method, apparatuses, and non-transitory computer-readable medium described herein may further include operations, features, means, or instructions for transmitting a capability message indicating that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

Some examples of the method, apparatuses, and non-transitory computer-readable medium described herein may further include operations, features, means, or instructions for detecting beam failure within a component carrier of the one or more of the component carriers included in the list based on monitoring for beam failure, receiving a beam failure recovery response message in response to transmitting a beam failure recovery request, and resetting one or more power control parameters for uplink transmissions to corresponding default values based on receiving the beam failure recovery response message.

In some examples of the method, apparatuses, and non-transitory computer-readable medium described herein, the one or more power control parameters for uplink transmissions apply to sounding reference signal transmissions, physical uplink control channel transmissions, physical uplink shared channel transmissions, or any combination thereof associated with a transmission and reception point for which the beam failure was detected.

Some examples of the method, apparatuses, and non-transitory computer-readable medium described herein may further include operations, features, means, or instructions for receiving an indication of multiple new beam indicator sets and selecting the multiple beam failure detection reference signal sets for the monitoring based on the multiple new beam indicator sets, where each of the multiple beam failure detection reference signal sets corresponds to a respective transmission and reception point, a respective control resource set pool, or both.

BRIEF DESCRIPTION OF THE DRAWINGS

FIG. 2 illustrates an example of a wireless communications system that supports beam failure detection reference signal set update in accordance with one or more examples as disclosed herein.

FIGS. 3A, 3B, and 3C illustrate examples of BFD-RS set update schemes that support beam failure detection reference signal set update in accordance with one or more examples as disclosed herein.

DETAILED DESCRIPTION

In the course of wireless communications, a user equipment (UE) may engage in a beam failure detection (BFD) process to detect when one or more transmission beams (e.g., from a network entity) have failed based on one or more conditions. To do so, the UE may measure one or more BFD reference signals (BFD-RSs). These BFD-RSs may be indicated to the UE in control signaling (e.g., medium access control control element (MAC-CE) signaling or other control signaling) and the control signaling may indicate multiple sets of BFD-RSs. The control signaling may apply the BFD-RS sets to all CCs in a CC list as it may be done in relation to beam indications. However, some CCs on the CC list may not be configured for multiple transmission and reception points (TRPs) or a per-TRP BFR scheme. As such, configuration conflicts may occur if the control signaling activates two BFD-RS sets and a CC on a CC list indicated in the control signaling may be configured for a single BFD-RS set.

The subject matter described herein includes techniques for addressing such configuration conflicts. In some examples, the configuration conflicts may be avoided by configuring the CC lists to include CCs that are all of a same type (e.g., configured for multiple BFD-RS sets or for a single BFD-RS set). In other examples, the UE may only apply the multiple BFD-RS sets to applicable CCs in the CC list. For example, if the control signaling indicates multiple BFD-RS sets, then the multiple BFD-RS sets would be applied to CCs configured for multiple BFD-RS sets. Similarly, if the control signaling indicates a single BFD-RS set, then the single BFD-RS sets would be applied to CCs configured for a single BFD-RS set. In yet other examples, if the control signaling indicates multiple BFD-RS sets, then the multiple BFD-RS sets would be applied to CCs configured for multiple BFD-RS sets and the first BFD-RS set of the multiple BFD-RS sets would be applied to CCs configured for a single BFD-RS set. In at least these ways, configuration conflicts may be avoided, and communications speed and reliability may be increased due to the reduced configuration conflicts.

Aspects of the disclosure are initially described in the context of wireless communications systems. Aspects of the disclosure are then described with reference to a wireless communications system, BFD-RS set update schemes, and a process flow. Aspects of the disclosure are further illustrated by and described with reference to apparatus diagrams, system diagrams, and flowcharts that relate to beam failure detection reference signal set update.

Figure 1:
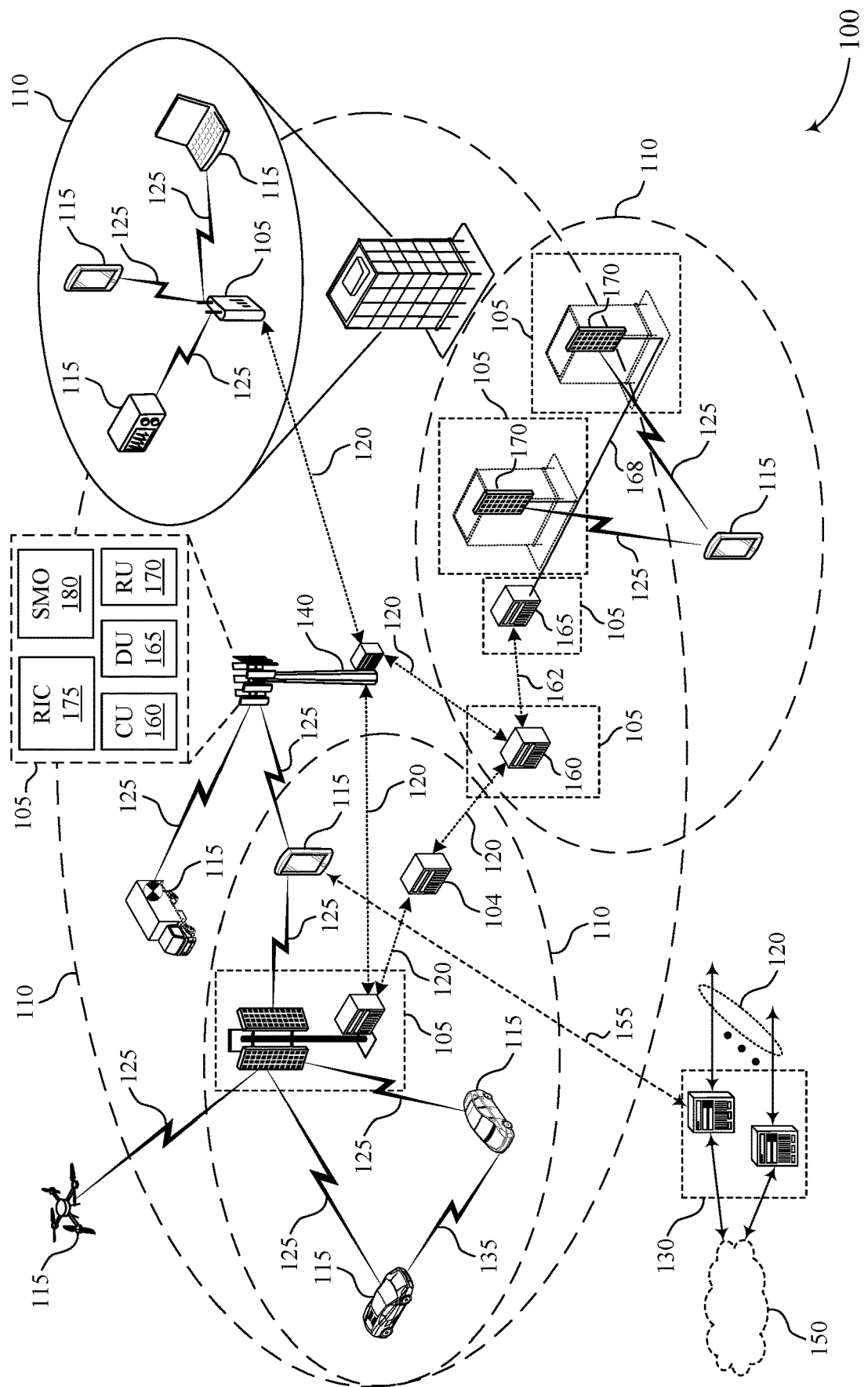
FIG. 1 illustrates an example of a wireless communications system that supports beam failure detection reference signal set update in accordance with one or more examples as disclosed herein.

FIG. 1 illustrates an example of a wireless communications system 100 that supports beam failure detection reference signal set update in accordance with one or more examples as disclosed herein. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam failure detection reference signal set update as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the UE may participate in a BFD process that may involve cross-CC indication on a list of CCs. The UE may receive control signaling (e.g., MAC-CE signaling) that may indicate one or more BFD-RS sets to be used for the BFD process. In some examples, the list of CCs may be of a single type, such as a CC type that is configured for a single BFD-RS set or a CC type CC type that is configured for multiple BFD-RS sets (e.g., two BFD-RS sets). In other examples, the MAC-CE may only apply to CCs in the list that are configured for the same number of BFD-RS sets as the MAC-CE indicates. In yet other examples, if the MAC-CE indicates multiple BFD-RS sets, CCs configured for a single BFD-RS set may use a first BFD-RS set of the multiple BFD-RS sets indicated in the MAC-CE.

FIG. 2 illustrates an example of a wireless communications system 200 that supports beam failure detection reference signal set update in accordance with one or more examples as disclosed herein. The wireless communications system 200 may include the UE 115-*a* and the network entity 105-*a*, and the UE 115-*a* may operate within a coverage area 110-*a* associated with the network entity 105-*a*.

In the course of wireless communications, the wireless communications system 200 may engage in a beam failure recovery procedure (e.g., to reestablish communications using a new beam after communications using another beam have failed). In some examples, a beam failure recovery process may include various operations. The UE 115-*a* may measure one or more BFD-RS sets and may determine whether beam failure is detected based on one or more conditions. Such BFD-RS sets may be configured in control signaling (e.g., RRC signaling) or may be identified by the UE 115-*a* (e.g., based on one or more CORESET beams).

The UE 115-*a* may (e.g., after detecting beam failure) may transmit a beam failure recovery (BFR) request (BFRQ) (e.g., to the network entity 105-*a*). In examples involving primary cell (PCell) BFR, the BFRQ may be transmitted using a random access procedure (e.g., a contention free random access channel (RACH) procedure). The UE may transmit random access procedure signaling in a new beam (e.g., a q_new beam). In examples involving secondary cell BFR, the UE 115-*a* may transmit the BFRQ in a Pcell (e.g., via a scheduling request in a physical uplink control channel (PUCCH) transmission). In turn, the network entity 105-*a* may respond with an uplink grant and the UE 115-*a* may use scheduled uplink resources (e.g., physical uplink shared channel (PUSCH) resources) to transmit BFR control signaling (e.g., a BFR MAC-CE). Such control signaling may include an indication of a replacement beam for the failed beam (e.g., a q_new beam indication). In some examples, the q_new may be identified from a defined set of reference signals (e.g., a new beam indicator (NBI) set of reference signals). In some examples, an NBI-RS may be configured in control signaling (e.g., RRC signaling).

The network entity 105-*a* may respond with a BFR response (BFRR), and the UE 115-*a* may begin using a new beam (e.g., the q_new beam) for communications (e.g., at a point in time 28 symbols after receiving the BFRR).

In some examples, a BFR procedure may be performed for individual transmission and reception points (TRPs) or on a per-TRP basis. For example, a cell may include different groups of beams and each group may correspond to a TRP. In some examples, a cell may include or be associated with multiple TRPs (or another quantity of TRPs). Beams, transmission configuration indication (TCI) states, or both from each TRP may be configured with different identifiers (e.g., CORESETpool IDs).

The UE 115-*a* may identify TRP association based on such identifiers (e.g., the CORESETpool IDs) and the UE 115-*a* may be configured with BFD-RSs, NBI-RSs, or both on a per-TRP or per-beam group basis. Multiple BFD-RS sets, NBI-RS sets, or both may be configured in a cell and one or more such sets may each correspond to a TRP. The UE 115-*a* may monitor a BFD resource per TRP and may trigger per-TRP BFR once per-TRP beam failure is detected. The UE may choose a new beam (e.g., q_new) from a corresponding NBI-RS set of the failed TRP. However, it is not always the case that all beams in a cell fail. As such, the UE 115-*a* may still transmit a BFR request (e.g., via a PUCCH or PUSCH). The wireless communications system 200 may employ an Scell BFRQ mechanism, which may include a two-step approach in which the UE 115-*a* first transmit a scheduling request to the network entity 105-*a*, after which the UE 115-*a* may transmit control signaling (e.g., a MAC-CE) for additional BFR information. In some examples, a BFD-RS set may be explicitly configured by the network entity 105-*a* or may be implicitly identifier by the UE 115-*a*. For example, the UE 115-*a* may implicitly identify one or more BFD-RS sets by identifying one or more reference signals that are quasi co-located (QCL'd) to one or more associated CORESET beams or TCI states.

In some examples, one or more BFD-RS sets may be configured or updated via control signaling (e.g., MAC-CE control signaling). For example, MAC-CE control signaling may be used to configure multiple BFD-RS sets (e.g., two or more BFD-RS sets for per-TRP BFR). Additionally, or alternatively, a single BFD-RS set may be configured (e.g., a single BFD-RS set for cell level BFR). Such a MAC-CE may include a field for an identifier, such as a cell identifier or a BWP identifier, and an update may only be applicable is only applicable to the indicated cell or BWP. In some examples, such updates may still be done on a per-component carrier (CC) basis.

In some examples, beam indication (e.g., including the use of MAC-CE to activate TCI for PDSCH, MAC-CE to update beam for PUCCH, or other beam indication), for CCs on a CC may be performed on a cross-CC basis (e.g., across different CCs on a CC list that may be predefined or configured in control signaling, such as RRC signaling). For example, a MAC-CE may apply to multiple or all CCs on the same CC list as the CC indicated in the MAC-CE.

In some examples, indication of BFD-RS may be performed through MAC-CE on a similar cross-CC basis (e.g., the MAC-CE for BFD-RS configuration may be applied to all CCs on the same CC list of the indicated CC). The CC list used for BFD-RS set indication may be the same CC list that is used for beam indication. However, in some situations, some CCs on the CC list may not be configured for multiple TRPs or per-TRP BFR. For example, if the MAC-CE activates two sets of BFD-RSs, and a CC on the same list of indicated CC is configured with single-TRP or cell level BFR (e.g., leading to CC being configured with a single BFD-RS set), a configuration conflict may occur. As such, different techniques described herein allow for avoidance or resolution of such conflicts.

For example, the UE 115-*a* may receive (e.g., from the network entity 105-*a*) a BFD-RS set indication 220 that indicates one or more BFD-RS sets (e.g., the first BFD-RS set 225 and the second BFD-RS set 230) that correspond to a list of one or more CCs 235. In some examples, uniform CC lists may be used in which all of the CCs are of the same type (e.g., a type that indicates a quantity of BFD-RS sets for which the CC 235 is configured). For example, a determination or identification of whether a CC 235 is to be included in the list may be based on whether the CC 235 is of a first type configured for a single BFD-RS set or is of a second type configured for multiple BFD-RS sets. Additionally, or alternatively, the BFD-RS set indication 220 may be applicable to a subset of the CCs 235 in the list, and a determination or identification of which CCs 235 to which the first BFD-RS set 225, the second BFD-RS set 230, or both may be applied is based on whether the CCs 235 in the list are of the first type configured for a single BFD-RS set or is of a second type configured for multiple BFD-RS sets. In some examples, once the UE 115-*a* determines which BFD-RS sets are applicable to which CCs 235 of the CC list, the UE 115-*a* may monitor one or more of the CCs 235 included in the list for beam failure of one or more of the beams 240 associated with the CCs 235 using the one or more indicated BFD-RS sets.

In at least these ways, configuration conflicts between control signaling and CCs of a CC list for BFD may be reduced or eliminated. This may also lead to increased communications reliability and speed, as BFR processes may not be affected by errors resulting from misconfiguration and BFR processes may be performed more rapidly.

In some examples, the CC list that is used for BFD-RS updates may be the same list that is used for beam indications. Additionally, or alternatively, the CC list for BFD-RS updates may be a separate list configured in control signaling (e.g., RRC signaling) that is dedicated for BFD-RS updates.

In some examples, multiple CC lists may be configured in control signaling and, in some examples, such CC lists may be non-overlapping (e.g., a given CC may only appear in one of the multiple CC lists).

In some examples, the UE 115-*a* may report whether it supports cross-CC BFD-RS set update, a maximum supported number of CCs on a CC list, a maximum supported quantity of CC lists, one or more other BFD-RS set update capabilities, or any combination thereof.

In some examples, if one or more BFD-RS sets are not configured, it may not be clear which or how many BFD-RS sets are to be identified or determined for BFR processes. As such, a UE 115-*a* may use one or more rules to implicitly identify or determine one or more BFD-RS sets. For example, if a second NBI set is configured, the UE 115-*a* may identify two sets of BFD-RS and each set of BFD-RS may correspond to a TRP or CORESETpool. For example, the UE 115-*a* may select a BFD-RS set for each CORE-SETpool as the periodic channel state information reference signals (P-CSI-RSs) that are used to define the TCI of the CORESETs in the corresponding CORESETpool. In some examples, a one-to-one mapping between a TRP and a CORESETpool may be used. However, if a second NBI set is not configured, the UE 115-*a* may identify or determine a single BFD-RS set to be used for BFD-RS update. For example, the UE 115-*a* may select a BFD RS set for a P-CSI-RS that is used to define the TCI of the CORESETs in the cell.

In some examples, after receiving the BFRR, uplink and downlink beams for communication may be reset to another beam (e.g., the q_new beam). However, for uplink communications, power control parameters applicable to the prior beam may not be applicable or may be less applicable to the new beam. As such, power control parameters may be reset (e.g., by the UE 115-*a* or the network entity 105-*a*) to one or more default values. Such power control parameters may include closed loop power control parameters for PUCCH, a sounding reference signal (SRS), PUSCH, other uplink transmissions, or any combination thereof. Further, different default values may be used for different channels or reference signals. Additionally, or alternatively, a reset of power control parameters in per-TRP BFR situations may apply to the SRS, PUCCH, PUSCH, or any combination thereof that are associated with the failed TRP or failed beam.

FIG. 3A illustrates an example of a BFD-RS set update scheme 301 that supports beam failure detection reference signal set update in accordance with one or more examples as disclosed herein. In the BFD-RS set update scheme 301, all CCs on the same CClist that share the same BFD-RS-update (e.g., performed via MAC-CE) is configured with the same BFR mode (e.g., a per-cell BFR mode or a per-TRP BFR mode) or is of a same type (e.g., a single BFD-RS set type or a dual BFD-RS set type). For example, each CC of the CC list 320-*a* is of a single BFD-RS set type and each CC of the CC list 320-*b* is of a dual BFD-RS set type. For example, each CC of the CC list 320-*a* may be configured for a single BFD-RS set. Such uniform CC lists may avoid configuration conflicts, since a MAC-CE may be configured for the single type (e.g., single BFD-RS set or dual BFD-RS set) used in the CC list. Though a dual BFD-RS set type or mode is discussed, it is to be understood that such techniques are applicable to any quantity of BFD-RS sets.

FIG. 3B illustrates an example of a BFD-RS set update scheme 302 that supports beam failure detection reference signal set update in accordance with one or more examples as disclosed herein. The BFD-RS set update scheme 302 includes a cc list 320-*c* to which the MAC-CE 325-*a* or the MAC-CE 325-*b* may apply. The MAC-CE 325-*a* includes or indicates a single BFD-RS set and the MAC-CE 325-*b* includes or indicates dual BFD-RS sets.

In some examples, a BFD-RS MAC-CE (e.g., the MAC-CE 325-*a* or the MAC-CE 325-*b*) may apply to the applicable CCs on the list and may not apply to non-applicable CCs. For example, when the BFD-RS MAC-CE contains two sets of BFD-RSs, as does the MAC-CE 235-*b*, an applicable CC may be a CC that is configured with per-TRP BFR or one that is configured with two NBI sets or BFD-RS sets (e.g., via control signaling such as RRC signaling). CC1, CC2, CC4, and CC6 may be examples of such applicable CCs in a situation involving the MAC-CE 325-*b*. Correspondingly, a non-applicable CC may be a CC configured with cell level BFR or a CC that is not configured with CORESETpool, has no activated TCI codepoints with more than 1 TCI, is configured with a single NBI set or BFD-RS set, or is not configured with any NBI or BFD-RS set. CC0, CC3, CC5, and CC7 may be examples of non-applicable CCs in a situation involving the MAC-CE 325-*b*.

Additionally, or alternatively, when the BFD-RS MAC-CE contains one set of BFD-RSs, as does the MAC-CE 235-*a*, an applicable CC may be a CC that is not configured with CORESETpool, has no activated TCI codepoints with more than 1 TCI, is configured with a single NBI set or BFD-RS set, or is not configured with any NBI or BFD-RS set. CC0, CC3, CC5, and CC7 may be examples of applicable CCs in a situation involving the MAC-CE 325-*a*. Correspondingly, a non-applicable CC for the MAC-CE 235-*a* may include a CC configured with per TRP level BFR, or with two NBI sets or BFD-RS sets (e.g., in control signaling such as RRC signaling). CC1, CC2, CC4, and CC6 may be examples of such non-applicable CCs in a situation involving the MAC-CE 325-*a*.

In some examples, control signaling (e.g., RRC signaling) may indicate whether a CC is for cell level BFR or for per-TRP BFR by one or more bits in control signaling.

FIG. 3C illustrates an example of a BFD-RS set update scheme 303 that supports beam failure detection reference signal set update in accordance with one or more examples as disclosed herein. In the BFD-RS set update scheme 303, the MAC-CE 325-*c* may indicate both the first BFD-RS set 330-*a* and the second BFD-RS set 330-*b* and the MAC-CE 325-*c* may be applicable to the CC list 320-*d*.

In some examples, when a BFD-RS MAC-CE (such as the MAC-CE 325-*c*) includes 2 set of BFD-RSs (e.g., the first BFD-RS set 330-*a* and the second BFD-RS set) and a CC on a CC list is for per cell BFR (e.g., the CC is configured for only one BFD-RS set), then one of the two BFD-RS sets in the MAC-CE is activated for the per cell BFR CC. For example, the first BFD-RS set 330-*a* may be activated for all of the CCs. However, the second BFD-RS set 330-*b* may be activated only for those CCs that are of the dual BFD-RS set type and are configured for dual BFD-RS sets, such as CC1, CC2, CC4, and CC6. CC0, CC3, CC5, and CC7 are only configured for the first BFD-RS set 330-*a*. In this way, configuration conflicts between the MAC-CE 325-*c* and CCs of the CC list 320-*d* that would not otherwise be compatible with the MAC-CE 325-*c* are reduced or eliminated.

Figure 4:
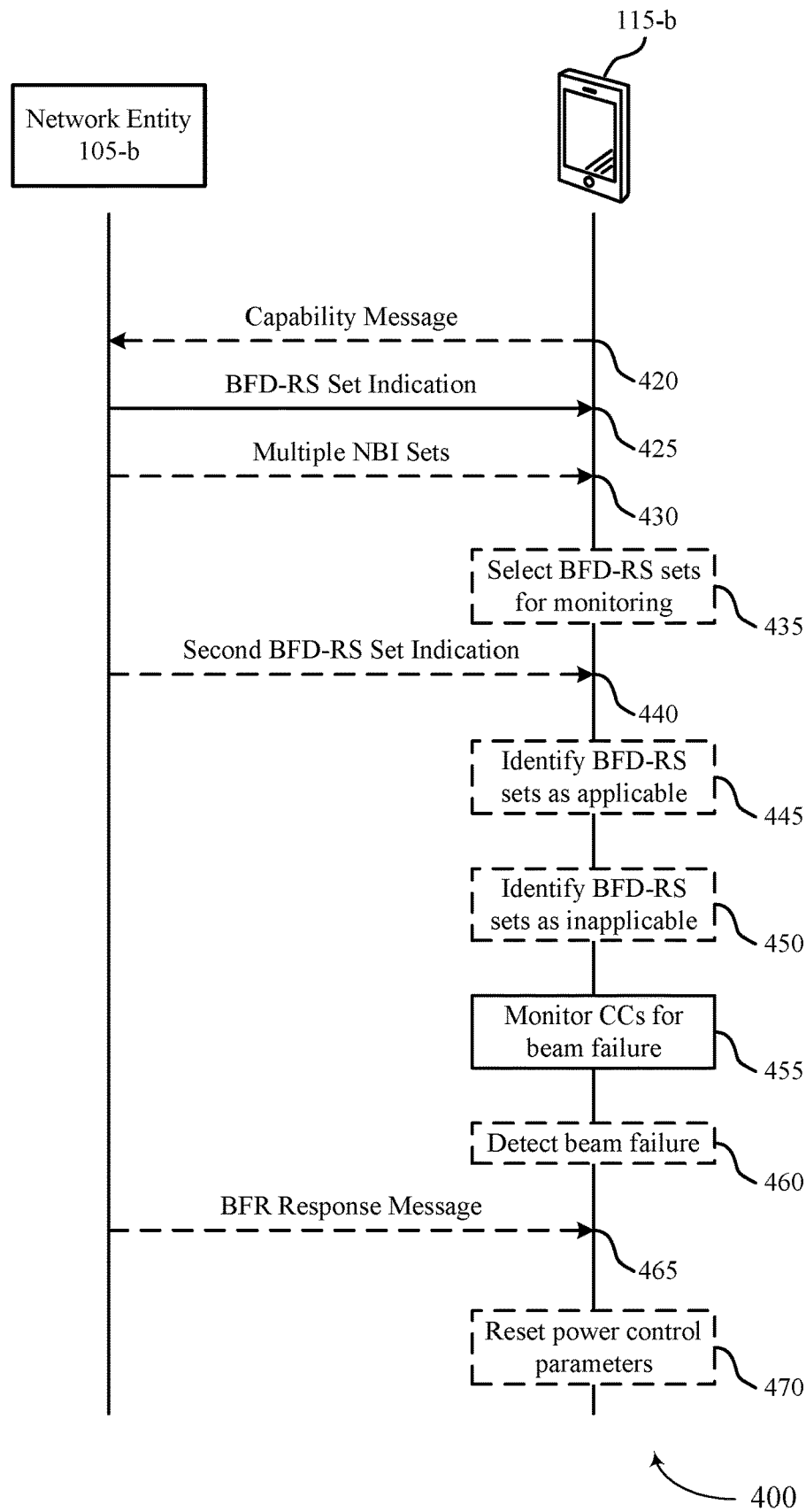
FIG. 4 illustrates an example of a process flow that supports beam failure detection reference signal set update in accordance with one or more examples as disclosed herein.

FIG. 4 illustrates an example of a process flow 400 that supports beam failure detection reference signal set update in accordance with one or more examples as disclosed herein. The process flow 400 may implement various aspects of the present disclosure described herein. The elements described in the process flow 400 (e.g., the network entity 105-*b* and the UE 115-*b*) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-*b* may transmit a capability message that may indicate that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

At 425, the UE 115-*b* may receive an indication of one or more beam failure detection reference signal sets corresponding to a list of component carriers and whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets.

In some examples, the indication of one or more beam failure detection reference signal sets may indicate multiple beam failure detection reference signal sets that correspond to the list of component carriers. Additionally, or alternatively, in some examples the indication of one or more beam failure detection reference signal sets may indicate a single beam failure detection reference signal set that corresponds to the list of component carriers.

In some examples, the list may include only component carriers of the first type configured for the single beam failure detection reference signal set or only component carriers of the second type configured for multiple beam failure detection reference signal sets, the component carriers of the second type that are included in the list each being configured for a same quantity of beam failure detection reference signal sets. In some examples, the component carriers of the first type comprise component carriers configured for per-cell beam failure recovery, and wherein the component carriers of the second type comprise component carriers configured for per-transmission and reception point (TRP) beam failure recovery. In some examples, the list of component carriers may include a list of component carriers for beam indications.

At 430, the UE 115-*b* may receive an indication of multiple new beam indicator sets.

At 435, the UE 115-*b* may select the multiple beam failure detection reference signal sets for the monitoring based on the multiple new beam indicator sets and each of the multiple beam failure detection reference signal sets corresponds to a respective transmission and reception point, a respective control resource set pool, or both.

At 440, the UE 115-*b* may receive a second indication of one or more second beam failure detection reference signal sets corresponding to a second list of component carriers and the second list of component carriers does not include any component carrier that is included in the list of component carriers.

At 445, the UE 115-*b* may identify, based on the multiple beam failure detection reference signal sets being indicated by the indication, the multiple beam failure detection reference signal sets as applicable to each component carrier included in the list that is of the second type configured for multiple beam failure detection reference signal sets. Additionally, or alternatively, the UE 115-*b* may identify, based on the single beam failure detection reference signal set being indicated by the indication, the single beam failure detection reference signal set as applicable to each component carrier included in the list that is of the first type configured for a single beam failure detection reference signal set. Additionally, or alternatively, the UE 115-*b* may identify, based on the multiple beam failure detection reference signal sets being indicated by the indication, that a first beam failure detection reference signal set of the multiple beam failure detection reference signal sets is applicable to each of the component carriers of the first type configured for a single beam failure detection reference signal set. Additionally, or alternatively, the UE 115-*b* may identify, based on the multiple beam failure detection reference signal sets being indicated by the indication, that the first beam failure detection reference signal set and a second beam failure detection reference signal set of the multiple beam failure detection reference signal sets are both applicable to each of the component carriers of the second type configured for multiple beam failure detection reference signal sets At 450, the UE 115-*b* may identify, based on the multiple beam failure detection reference signal sets being indicated by the indication, the indication of the multiple beam failure detection reference signal sets as inapplicable to each component carrier included in the list that is of the first type configured for a single beam failure detection reference signal set. Additionally, or alternatively, the UE 115-*b* may identify, based on the single beam failure detection reference signal set being indicated by the indication, the indication of the single beam failure detection reference signal set as inapplicable to each component carrier included in the list that is of the second type configured for multiple beam failure detection reference signal sets.

At 455, the UE 115-*b* may monitor one or more component carriers included in the list for beam failure using the one or more indicated beam failure detection reference signal sets. In some examples, the monitoring includes monitoring each component carrier included in the list that is of the second type using each of the multiple beam failure detection reference signal sets based on the multiple beam failure detection reference signal sets being applicable to each component carrier included in the list that is of the second type. In some examples, the monitoring includes monitoring each component carrier included in the list that is of the first type using the single beam failure detection reference signal set based on the single beam failure detection reference signal set being applicable to each component carrier included in the list that is of the first type. In some examples, the monitoring includes monitoring each component carrier included in the list that is of the second type using both the first beam failure detection reference signal set and the second beam failure detection reference signal set based on the first beam failure detection reference signal set and the second beam failure detection reference signal set both being applicable to each component carrier included in the list that is of the second type.

At 460, the UE 115-*b* may detect beam failure within a component carrier of the one or more of the component carriers included in the list based on monitoring for beam failure.

At 465, the UE 115-*b* may receive a beam failure recovery response message in response to transmitting a beam failure recovery request.

At 470, the UE 115-*b* may reset one or more power control parameters for uplink transmissions to corresponding default values based on receiving the beam failure recovery response message. In some examples, the one or more power control parameters for uplink transmissions apply to sounding reference signal transmissions, physical uplink control channel transmissions, physical uplink shared channel transmissions, or any combination thereof associated with a transmission and reception point for which the beam failure was detected.

Figure 5:
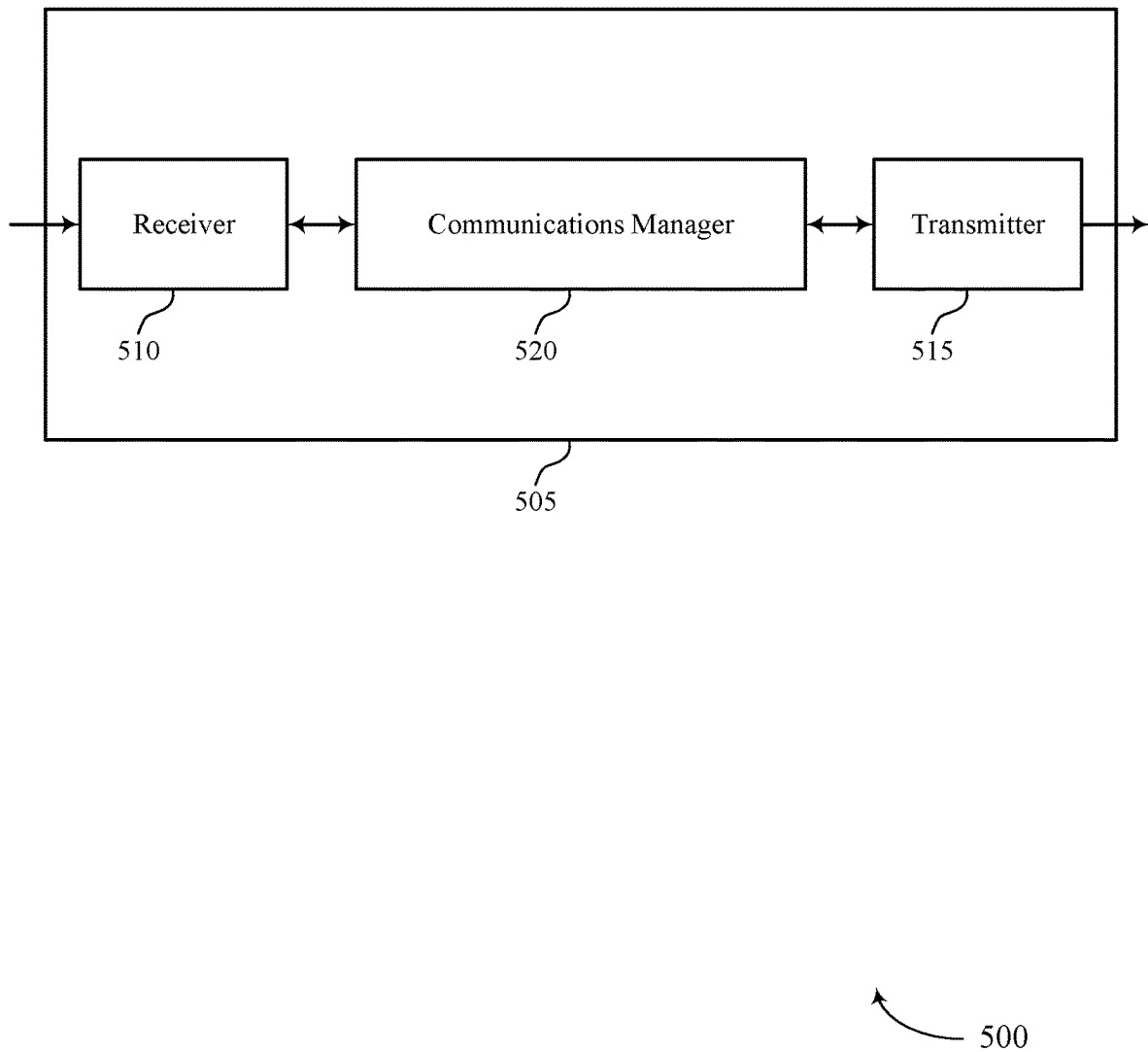
FIGS. 5 and 6 illustrate block diagrams of devices that support beam failure detection reference signal set update in accordance with one or more examples as disclosed herein.

FIG. 5 illustrates a block diagram 500 of a device 505 that supports beam failure detection reference signal set update in accordance with one or more examples as disclosed herein. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam failure detection reference signal set update). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam failure detection reference signal set update). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam failure detection reference signal set update as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications at a UE in accordance with examples as disclosed herein. For example, the communications manager 520 may be configured as or otherwise support a means for receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The communications manager 520 may be configured as or otherwise support a means for monitoring one or more component carriers included in the list for beam failure using the one or more indicated beam failure detection reference signal sets.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
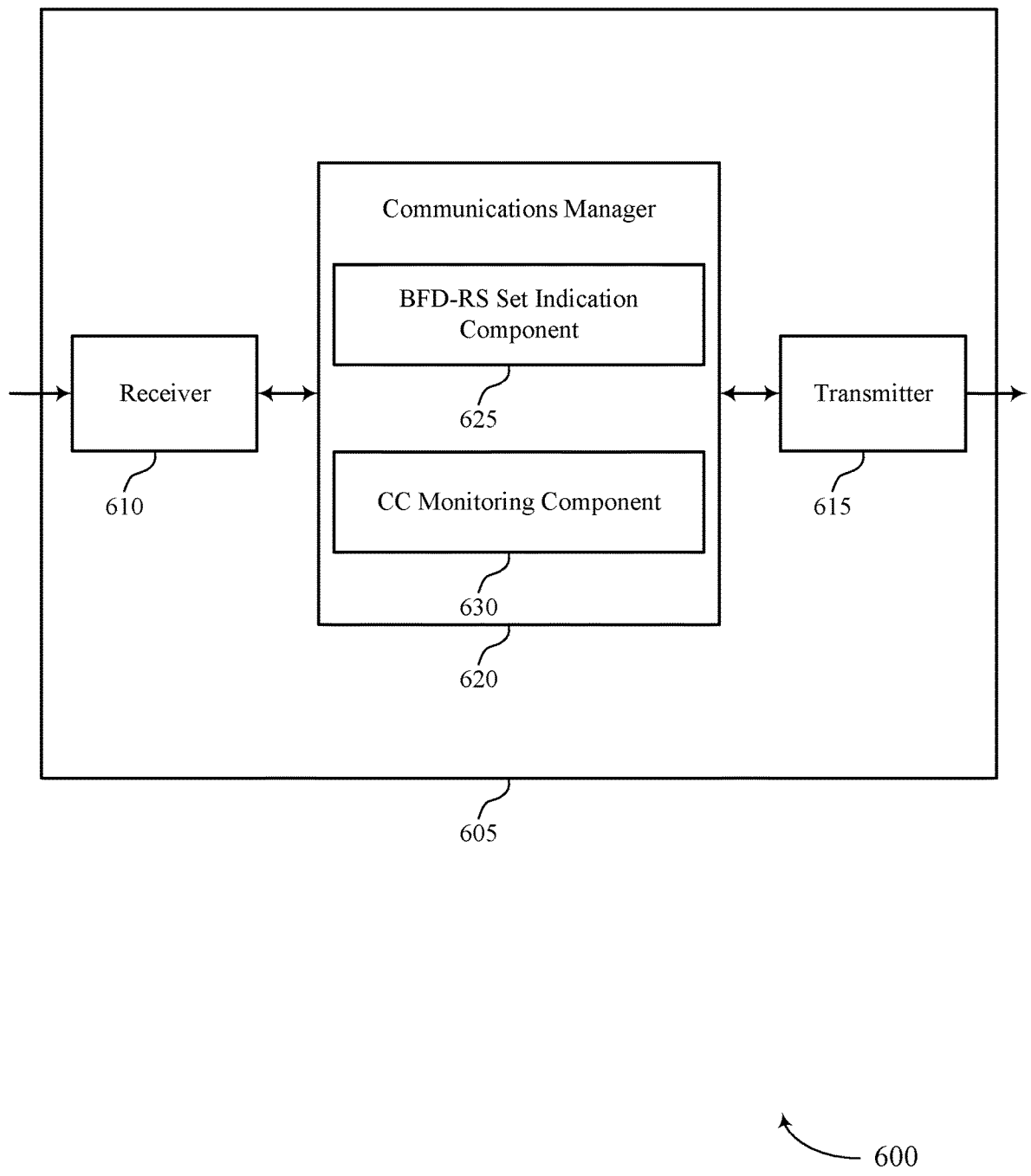

FIG. 6 illustrates a block diagram 600 of a device 605 that supports beam failure detection reference signal set update in accordance with one or more examples as disclosed herein. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam failure detection reference signal set update). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam failure detection reference signal set update). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam failure detection reference signal set update as described herein. For example, the communications manager 620 may include an BFD-RS set indication component 625 a CC monitoring component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The BFD-RS set indication component 625 may be configured as or otherwise support a means for receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The CC monitoring component 630 may be configured as or otherwise support a means for monitoring one or more component carriers included in the list for beam failure using the one or more indicated beam failure detection reference signal sets.

Figure 7:
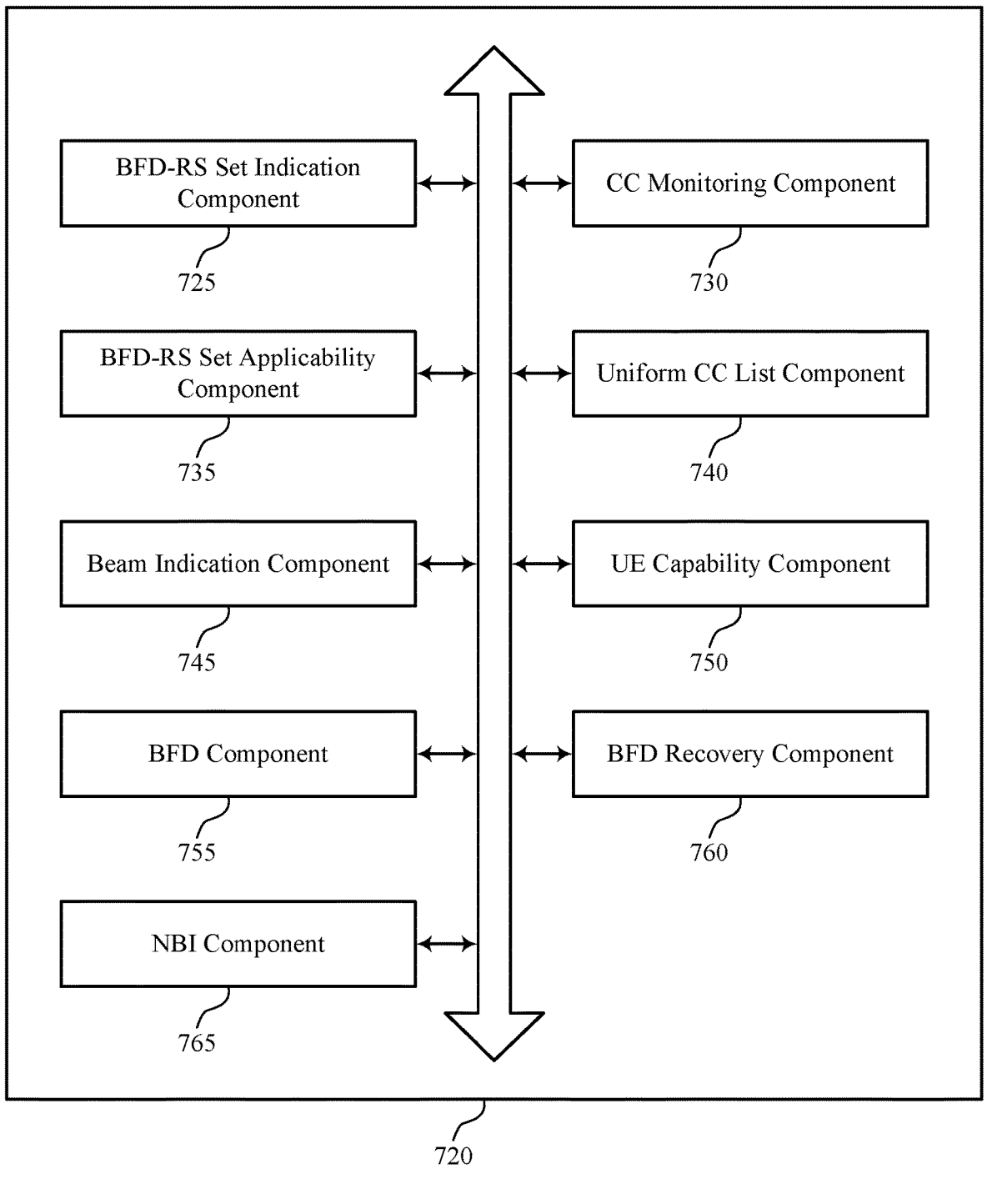
FIG. 7 illustrates a block diagram of a communications manager that supports beam failure detection reference signal set update in accordance with one or more examples as disclosed herein.

FIG. 7 illustrates a block diagram 700 of a communications manager 720 that supports beam failure detection reference signal set update in accordance with one or more examples as disclosed herein. The communications manager 720 may be an example of aspects of a communications manager 520, a communications manager 620, or both, as described herein. The communications manager 720, or various components thereof, may be an example of means for performing various aspects of beam failure detection reference signal set update as described herein. For example, the communications manager 720 may include an BFD-RS set indication component 725, a CC monitoring component 730, an BFD-RS set applicability component 735, a uniform CC list component 740, a beam indication component 745, a UE capability component 750, an BFD component 755, an BFD recovery component 760, an NBI component 765, or any combination thereof. Each of these components may communicate, directly or indirectly, with one another (e.g., via one or more buses).

Additionally, or alternatively, the communications manager 720 may support wireless communications at a UE in accordance with examples as disclosed herein. The BFD-RS set indication component 725 may be configured as or otherwise support a means for receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The CC monitoring component 730 may be configured as or otherwise support a means for monitoring one or more component carriers included in the list for beam failure using the one or more indicated beam failure detection reference signal sets.

In some examples, the indication of one or more beam failure detection reference signal sets indicates multiple beam failure detection reference signal sets that correspond to the list of component carriers, and the BFD-RS set applicability component 735 may be configured as or otherwise support a means for identifying, based on the multiple beam failure detection reference signal sets being indicated by the indication, the multiple beam failure detection reference signal sets as applicable to each component carrier included in the list that is of the second type configured for multiple beam failure detection reference signal sets. In some examples, the CC monitoring component 730 may be configured as or otherwise support a means for monitoring each component carrier included in the list that is of the second type using each of the multiple beam failure detection reference signal sets based on the multiple beam failure detection reference signal sets being applicable to each component carrier included in the list that is of the second type.

In some examples, the BFD-RS set applicability component 735 may be configured as or otherwise support a means for identifying, based on the multiple beam failure detection reference signal sets being indicated by the indication, the indication of the multiple beam failure detection reference signal sets as inapplicable to each component carrier included in the list that is of the first type configured for a single beam failure detection reference signal set.

In some examples, the indication of one or more beam failure detection reference signal sets indicates a single beam failure detection reference signal set that corresponds to the list of component carriers, and the BFD-RS set applicability component 735 may be configured as or otherwise support a means for identifying, based on the single beam failure detection reference signal set being indicated by the indication, the single beam failure detection reference signal set as applicable to each component carrier included in the list that is of the first type configured for a single beam failure detection reference signal set. In some examples, the CC monitoring component 730 may be configured as or otherwise support a means for monitoring each component carrier included in the list that is of the first type using the single beam failure detection reference signal set based on the single beam failure detection reference signal set being applicable to each component carrier included in the list that is of the first type.

In some examples, the BFD-RS set applicability component 735 may be configured as or otherwise support a means for identifying, based on the single beam failure detection reference signal set being indicated by the indication, the indication of the single beam failure detection reference signal set as inapplicable to each component carrier included in the list that is of the second type configured for multiple beam failure detection reference signal sets.

In some examples, the indication of one or more beam failure detection reference signal sets indicates multiple beam failure detection reference signal sets that correspond to the list of component carriers, and the BFD-RS set applicability component 735 may be configured as or otherwise support a means for identifying, based on the multiple beam failure detection reference signal sets being indicated by the indication, that a first beam failure detection reference signal set of the multiple beam failure detection reference signal sets is applicable to each of the component carriers of the first type configured for a single beam failure detection reference signal set. In some examples the CC monitoring component 730 may be configured as or otherwise support a means for monitoring each component carrier included in the list that is of the first type using the first beam failure detection reference signal set based on the first beam failure detection reference signal set being applicable to each component carrier included in the list that is of the first type.

In some examples, the BFD-RS set applicability component 735 may be configured as or otherwise support a means for identifying, based on the multiple beam failure detection reference signal sets being indicated by the indication, that the first beam failure detection reference signal set and a second beam failure detection reference signal set of the multiple beam failure detection reference signal sets are both applicable to each of the component carriers of the second type configured for multiple beam failure detection reference signal sets. In some examples the CC monitoring component 730 may be configured as or otherwise support a means for monitoring each component carrier included in the list that is of the second type using both the first beam failure detection reference signal set and the second beam failure detection reference signal set based on the first beam failure detection reference signal set and the second beam failure detection reference signal set both being applicable to each component carrier included in the list that is of the second type.

In some examples, the list includes only component carriers of the first type configured for the single beam failure detection reference signal set or only component carriers of the second type configured for multiple beam failure detection reference signal sets, the component carriers of the second type that are included in the list each being configured for a same quantity of beam failure detection reference signal sets.

In some examples, the component carriers of the first type include component carriers configured for per-cell beam failure recovery, and where the component carriers of the second type include component carriers configured for per-transmission and reception point (TRP) beam failure recovery.

In some examples, the list of component carriers includes a list of component carriers for beam indications.

In some examples, the BFD-RS set indication component 725 may be configured as or otherwise support a means for receiving a second indication of one or more second beam failure detection reference signal sets corresponding to a second list of component carriers, where the second list of component carriers does not include any component carrier that is included in the list of component carriers.

In some examples, the UE capability component 750 may be configured as or otherwise support a means for transmitting a capability message indicating that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

In some examples, the BFD component 755 may be configured as or otherwise support a means for detecting beam failure within a component carrier of the one or more of the component carriers included in the list based on monitoring for beam failure. In some examples, the BFD recovery component 760 may be configured as or otherwise support a means for receiving a beam failure recovery response message in response to transmitting a beam failure recovery request. In some examples, the BFD recovery component 760 may be configured as or otherwise support a means for resetting one or more power control parameters for uplink transmissions to corresponding default values based on receiving the beam failure recovery response message.

In some examples, the one or more power control parameters for uplink transmissions apply to sounding reference signal transmissions, physical uplink control channel transmissions, physical uplink shared channel transmissions, or any combination thereof associated with a transmission and reception point for which the beam failure was detected.

In some examples, the NBI component 765 may be configured as or otherwise support a means for receiving an indication of multiple new beam indicator sets. In some examples, the BFD-RS set applicability component 735 may be configured as or otherwise support a means for selecting the multiple beam failure detection reference signal sets for the monitoring based on the multiple new beam indicator sets, where each of the multiple beam failure detection reference signal sets corresponds to a respective transmission and reception point, a respective control resource set pool, or both.

Figure 8:
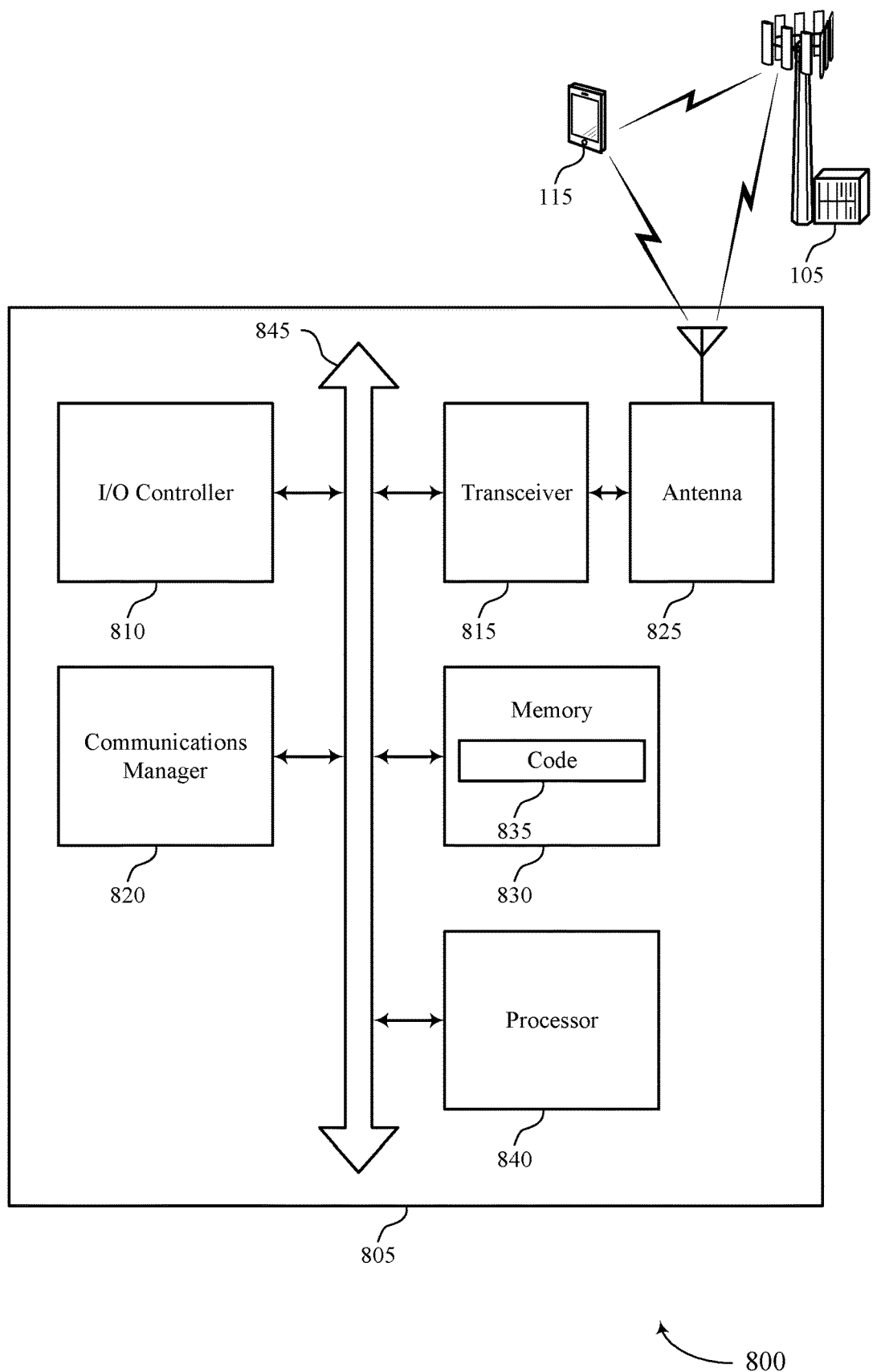
FIG. 8 illustrates a diagram of a system including a device that supports beam failure detection reference signal set update in accordance with one or more examples as disclosed herein.

FIG. 8 illustrates a diagram of a system 800 including a device 805 that supports beam failure detection reference signal set update in accordance with one or more examples as disclosed herein. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam failure detection reference signal set update). For example, the device 805 or a component of the device 805 may include a processor 840 and memory 830 coupled with or to the processor 840, the processor 840 and memory 830 configured to perform various functions described herein.

Additionally, or alternatively, the communications manager 820 may support wireless communications at a UE in accordance with examples as disclosed herein. For example, the communications manager 820 may be configured as or otherwise support a means for receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The communications manager 820 may be configured as or otherwise support a means for monitoring one or more component carriers included in the list for beam failure using the one or more indicated beam failure detection reference signal sets.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam failure detection reference signal set update as described herein, or the processor 840 and the memory 830 may be otherwise configured to perform or support such operations.

Figure 9:
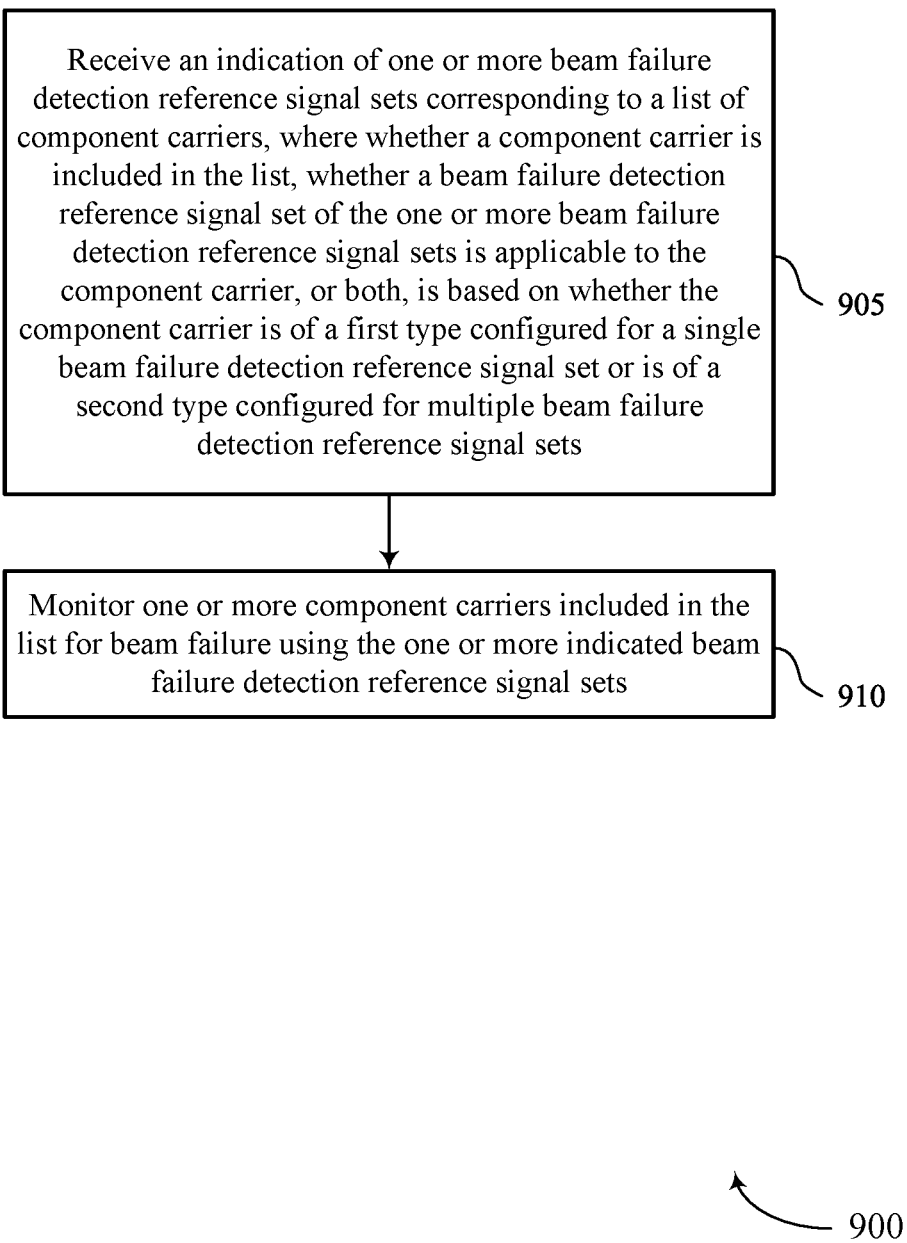
FIGS. 9 through 12 illustrate flowcharts showing methods that support beam failure detection reference signal set update in accordance with one or more examples as disclosed herein.

FIG. 9 illustrates a flowchart illustrating a method 900 that supports beam failure detection reference signal set update in accordance with one or more examples as disclosed herein. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The operations of 905 may be performed in accordance with examples as disclosed herein. In some examples, aspects of the operations of 905 may be performed by an BFD-RS set indication component 725 as described with reference to FIG. 7. Additionally, or alternatively, means for performing 905 may include, for example, the communications manager 820, the input/output (I/O) controller 810, the transceiver 815, the antenna 825, the memory 830, the code 835, the processor 840, or any combination thereof.

At 910, the method may include monitoring one or more component carriers included in the list for beam failure using the one or more indicated beam failure detection reference signal sets. The operations of 910 may be performed in accordance with examples as disclosed herein. In some examples, aspects of the operations of 910 may be performed by a CC monitoring component 730 as described with reference to FIG. 7. Additionally, or alternatively, means for performing 910 may include, for example, the communications manager 820, the input/output (I/O) controller 810, the transceiver 815, the antenna 825, the memory 830, the code 835, the processor 840, or any combination thereof.

Figure 10:
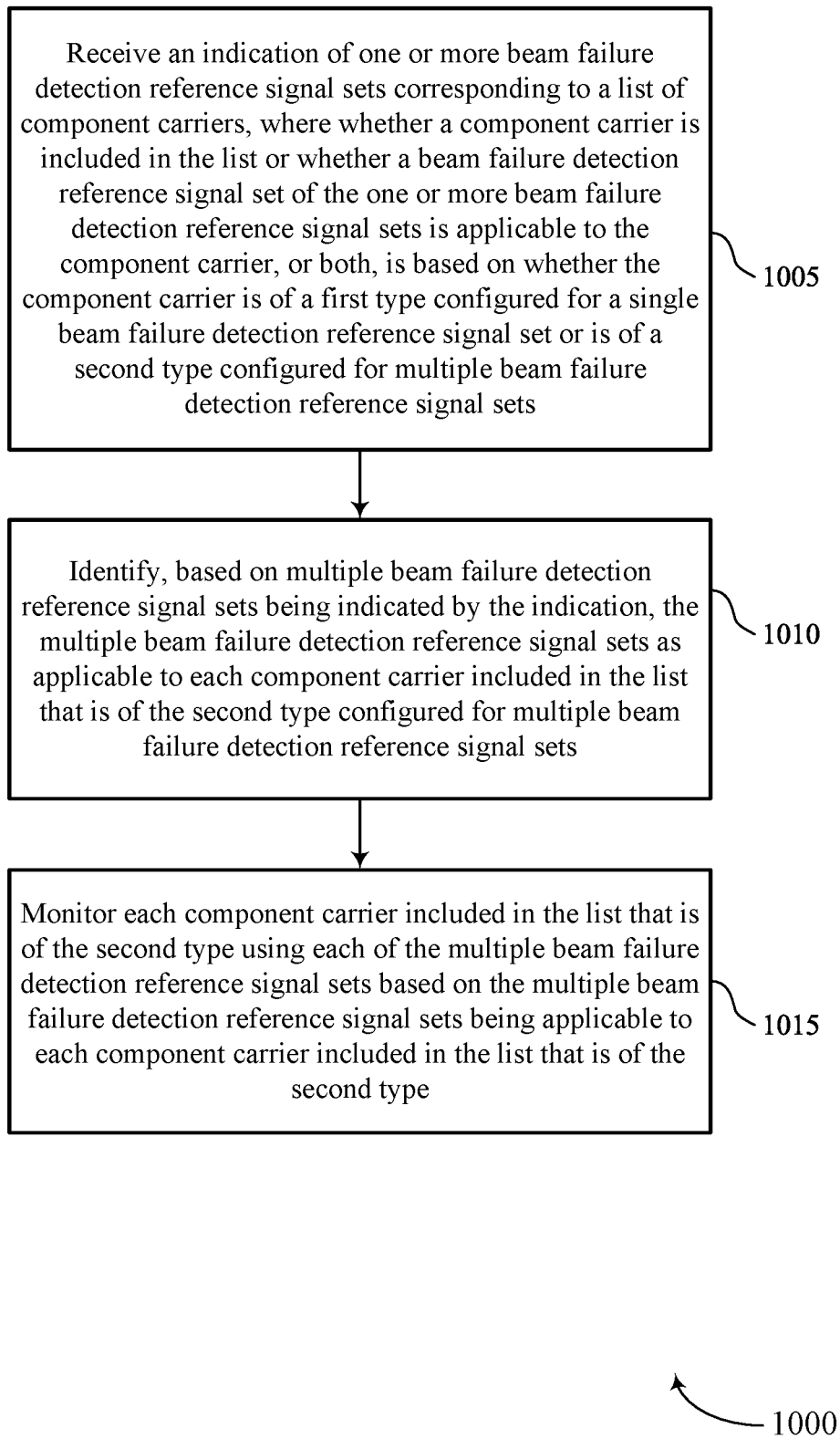

FIG. 10 illustrates a flowchart illustrating a method 1000 that supports beam failure detection reference signal set update in accordance with one or more examples as disclosed herein. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The operations of 1005 may be performed in accordance with examples as disclosed herein. In some examples, aspects of the operations of 1005 may be performed by an BFD-RS set indication component 725 as described with reference to FIG. 7. Additionally, or alternatively, means for performing 1005 may include, for example, the communications manager 820, the input/output (I/O) controller 810, the transceiver 815, the antenna 825, the memory 830, the code 835, the processor 840, or any combination thereof.

At 1010, the method may include identifying, based on multiple beam failure detection reference signal sets being indicated by the indication, the multiple beam failure detection reference signal sets as applicable to each component carrier included in the list that is of the second type configured for multiple beam failure detection reference signal sets. The operations of 1010 may be performed in accordance with examples as disclosed herein. In some examples, aspects of the operations of 1010 may be performed by a BFD-RS set applicability component 735 as described with reference to FIG. 7. Additionally, or alternatively, means for performing 1010 may include, for example, the communications manager 820, the input/output (I/O) controller 810, the transceiver 815, the antenna 825, the memory 830, the code 835, the processor 840, or any combination thereof.

At 1015, the method may include monitoring each component carrier included in the list that is of the second type using each of the multiple beam failure detection reference signal sets based on the multiple beam failure detection reference signal sets being applicable to each component carrier included in the list that is of the second type. The operations of 1015 may be performed in accordance with examples as disclosed herein. In some examples, aspects of the operations of 1015 may be performed by a CC monitoring component 730 as described with reference to FIG. 7. Additionally, or alternatively, means for performing 1015 may include, for example, the communications manager 820, the input/output (I/O) controller 810, the transceiver 815, the antenna 825, the memory 830, the code 835, the processor 840, or any combination thereof.

Figure 11:
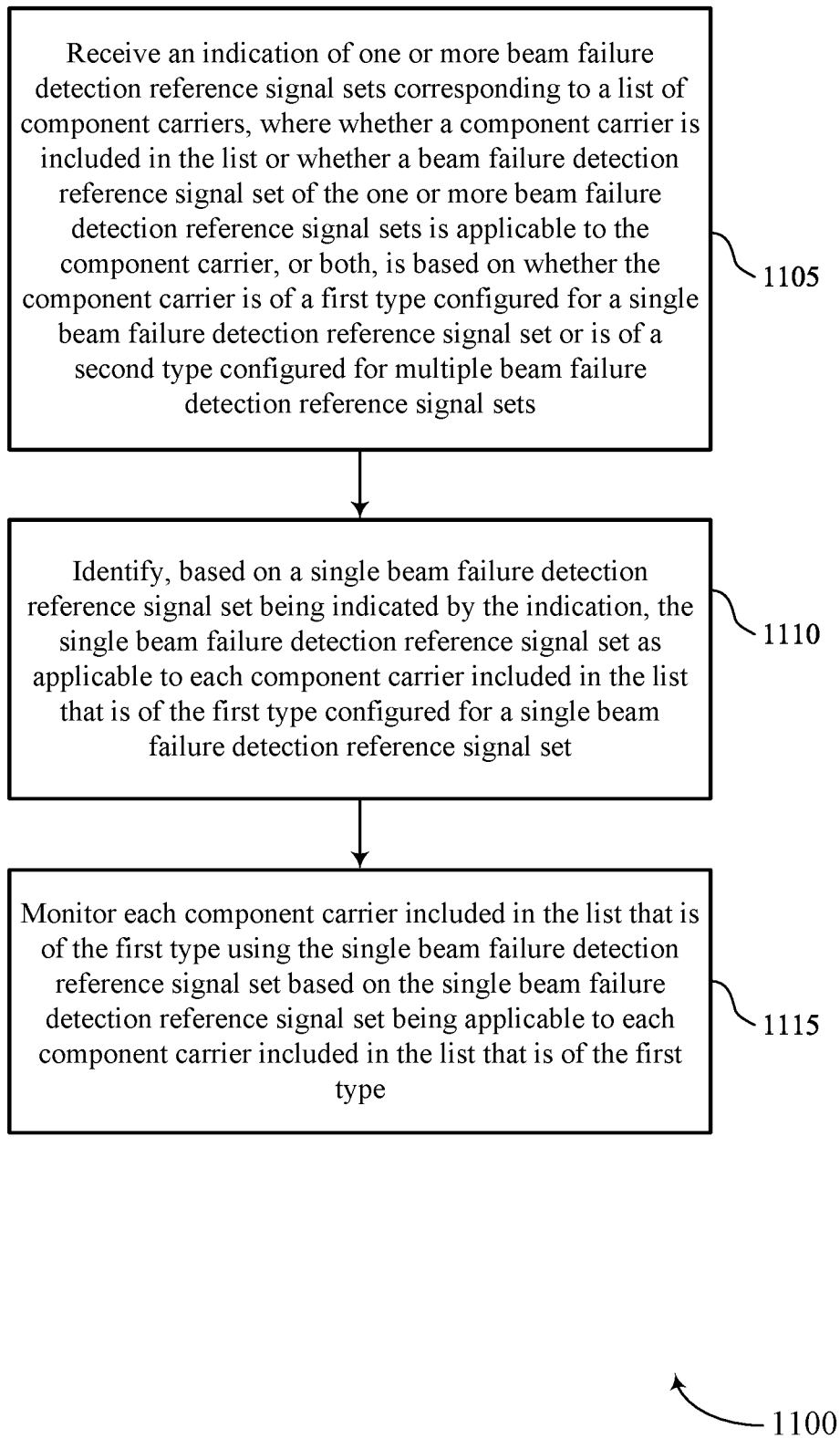

FIG. 11 illustrates a flowchart illustrating a method 1100 that supports beam failure detection reference signal set update in accordance with one or more examples as disclosed herein. The operations of the method 1100 may be implemented by a UE or its components as described herein.

For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The operations of 1105 may be performed in accordance with examples as disclosed herein. In some examples, aspects of the operations of 1105 may be performed by an BFD-RS set indication component 725 as described with reference to FIG. 7. Additionally, or alternatively, means for performing 1105 may include, for example, the communications manager 820, the input/output (I/O) controller 810, the transceiver 815, the antenna 825, the memory 830, the code 835, the processor 840, or any combination thereof.

At 1110, the method may include identifying, based on a single beam failure detection reference signal set being indicated by the indication, the single beam failure detection reference signal set as applicable to each component carrier included in the list that is of the first type configured for a single beam failure detection reference signal set. The operations of 1110 may be performed in accordance with examples as disclosed herein. In some examples, aspects of the operations of 1110 may be performed by a BFD-RS set applicability component 735 as described with reference to FIG. 7. Additionally, or alternatively, means for performing 1110 may include, for example, the communications manager 820, the input/output (I/O) controller 810, the transceiver 815, the antenna 825, the memory 830, the code 835, the processor 840, or any combination thereof.

At 1115, the method may include monitoring each component carrier included in the list that is of the first type using the single beam failure detection reference signal set based on the single beam failure detection reference signal set being applicable to each component carrier included in the list that is of the first type. The operations of 1115 may be performed in accordance with examples as disclosed herein. In some examples, aspects of the operations of 1115 may be performed by a CC monitoring component 730 as described with reference to FIG. 7. Additionally, or alternatively, means for performing 1115 may include, for example, the communications manager 820, the input/output (I/O) controller 810, the transceiver 815, the antenna 825, the memory 830, the code 835, the processor 840, or any combination thereof.

Figure 12:
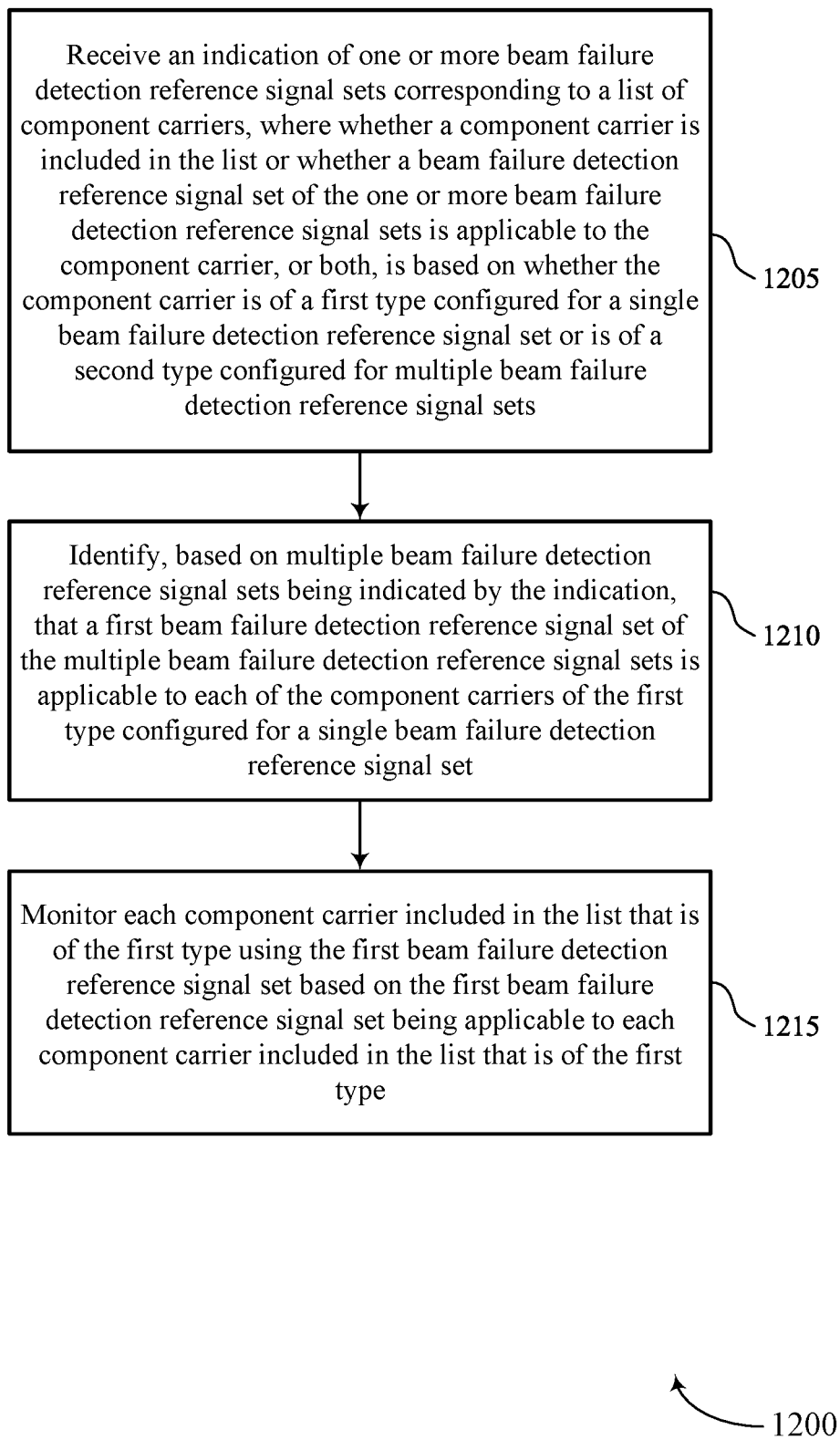

FIG. 12 illustrates a flowchart illustrating a method 1200 that supports beam failure detection reference signal set update in accordance with one or more examples as disclosed herein. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving an indication of one or more beam failure detection reference signal sets corresponding to a list of component carriers, where whether a component carrier is included in the list or whether a beam failure detection reference signal set of the one or more beam failure detection reference signal sets is applicable to the component carrier, or both, is based on whether the component carrier is of a first type configured for a single beam failure detection reference signal set or is of a second type configured for multiple beam failure detection reference signal sets. The operations of 1205 may be performed in accordance with examples as disclosed herein. In some examples, aspects of the operations of 1205 may be performed by an BFD-RS set indication component 725 as described with reference to FIG. 7. Additionally, or alternatively, means for performing 1205 may include, for example, the communications manager 820, the input/output (I/O) controller 810, the transceiver 815, the antenna 825, the memory 830, the code 835, the processor 840, or any combination thereof.

At 1210, the method may include identifying, based on multiple beam failure detection reference signal sets being indicated by the indication, that a first beam failure detection reference signal set of the multiple beam failure detection reference signal sets is applicable to each of the component carriers of the first type configured for a single beam failure detection reference signal set. The operations of 1210 may be performed in accordance with examples as disclosed herein. In some examples, aspects of the operations of 1210 may be performed by a BFD-RS set applicability component 735 as described with reference to FIG. 7. Additionally, or alternatively, means for performing 1210 may include, for example, the communications manager 820, the input/output (I/O) controller 810, the transceiver 815, the antenna 825, the memory 830, the code 835, the processor 840, or any combination thereof.

At 1215, the method may include monitoring each component carrier included in the list that is of the first type using the first beam failure detection reference signal set based on the first beam failure detection reference signal set being applicable to each component carrier included in the list that is of the first type. The operations of 1215 may be performed in accordance with examples as disclosed herein. In some examples, aspects of the operations of 1215 may be performed by a CC monitoring component 730 as described with reference to FIG. 7. Additionally, or alternatively, means for performing 1215 may include, for example, the communications manager 820, the input/output (I/O) controller 810, the transceiver 815, the antenna 825, the memory 830, the code 835, the processor 840, or any combination thereof.

The following provides an overview of aspects of the present disclosure:

Aspect 1: A method for wireless communications at a UE, comprising: receiving an indication of one or more beam failure detection reference signal sets corresponding to a list of component carriers, wherein whether a component carrier is included in the list or whether a beam failure detection reference signal set of the one or more beam failure detection reference signal sets is applicable to the component carrier, or both, is based at least in part on whether the component carrier is of a first type configured for a single beam failure detection reference signal set or is of a second type configured for multiple beam failure detection reference signal sets; and monitoring one or more component carriers included in the list for beam failure using the one or more indicated beam failure detection reference signal sets.

Aspect 2: The method of aspect 1, wherein the indication of one or more beam failure detection reference signal sets indicates multiple beam failure detection reference signal sets that correspond to the list of component carriers, the method further comprising: identifying, based at least in part on the multiple beam failure detection reference signal sets being indicated by the indication, the multiple beam failure detection reference signal sets as applicable to each component carrier included in the list that is of the second type configured for multiple beam failure detection reference signal sets, wherein: the monitoring comprises monitoring each component carrier included in the list that is of the second type using each of the multiple beam failure detection reference signal sets based at least in part on the multiple beam failure detection reference signal sets being applicable to each component carrier included in the list that is of the second type.

Aspect 3: The method of aspect 2, further comprising: identifying, based at least in part on the multiple beam failure detection reference signal sets being indicated by the indication, the indication of the multiple beam failure detection reference signal sets as inapplicable to each component carrier included in the list that is of the first type configured for a single beam failure detection reference signal set.

Aspect 4: The method of any of aspects 2 through 3, wherein the indication of one or more beam failure detection reference signal sets indicates a single beam failure detection reference signal set that corresponds to the list of component carriers, the method further comprising: identifying, based at least in part on the single beam failure detection reference signal set being indicated by the indication, the single beam failure detection reference signal set as applicable to each component carrier included in the list that is of the first type configured for a single beam failure detection reference signal set, wherein: the monitoring comprises monitoring each component carrier included in the list that is of the first type using the single beam failure detection reference signal set based at least in part on the single beam failure detection reference signal set being applicable to each component carrier included in the list that is of the first type.

Aspect 5: The method of any of aspects 1 through 4, further comprising: identifying, based at least in part on the single beam failure detection reference signal set being indicated by the indication, the indication of the single beam failure detection reference signal set as inapplicable to each component carrier included in the list that is of the second type configured for multiple beam failure detection reference signal sets.

Aspect 6: The method of any of aspects 1 through 5, wherein the indication of one or more beam failure detection reference signal sets indicates multiple beam failure detection reference signal sets that correspond to the list of component carriers, the method further comprising: identifying, based at least in part on the multiple beam failure detection reference signal sets being indicated by the indication, that a first beam failure detection reference signal set of the multiple beam failure detection reference signal sets is applicable to each of the component carriers of the first type configured for a single beam failure detection reference signal set, wherein: the monitoring comprises monitoring each component carrier included in the list that is of the first type using the first beam failure detection reference signal set based at least in part on the first beam failure detection reference signal set being applicable to each component carrier included in the list that is of the second type.

Aspect 7: The method of aspect 6, further comprising: identifying, based at least in part on the multiple beam failure detection reference signal sets being indicated by the indication, that the first beam failure detection reference signal set and a second beam failure detection reference signal set of the multiple beam failure detection reference signal sets are both applicable to each of the component carriers of the second type configured for multiple beam failure detection reference signal sets, wherein: the monitoring comprises monitoring each component carrier included in the list that is of the second type using both the first beam failure detection reference signal set and the second beam failure detection reference signal set based at least in part on the first beam failure detection reference signal set and the second beam failure detection reference signal set both being applicable to each component carrier included in the list that is of the second type.

Aspect 8: The method of any of aspects 1 through 7, wherein the list comprises only component carriers of the first type configured for the single beam failure detection reference signal set or only component carriers of the second type configured for multiple beam failure detection reference signal sets, the component carriers of the second type that are included in the list each being configured for a same quantity of beam failure detection reference signal sets.

Aspect 9: The method of aspect 8, wherein the component carriers of the first type comprise component carriers configured for per-cell beam failure recovery, and wherein the component carriers of the second type comprise component carriers configured for per-transmission and reception point (TRP) beam failure recovery.

Aspect 10: The method of any of aspects 1 through 9, wherein the list of component carriers comprises a list of component carriers for beam indications.

Aspect 11: The method of any of aspects 1 through 10, further comprising: receiving a second indication of one or more second beam failure detection reference signal sets corresponding to a second list of component carriers, wherein the second list of component carriers does not include any component carrier that is included in the list of component carriers.

Aspect 12: The method of any of aspects 1 through 11, further comprising: transmitting a capability message indicating that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

Aspect 13: The method of any of aspects 1 through 12, further comprising: detecting beam failure within a component carrier of the one or more of the component carriers included in the list based at least in part on monitoring for beam failure; receiving a beam failure recovery response message in response to transmitting a beam failure recovery request; and resetting one or more power control parameters for uplink transmissions to corresponding default values based at least in part on receiving the beam failure recovery response message.

Aspect 14: The method of aspect 13, wherein the one or more power control parameters for uplink transmissions apply to sounding reference signal transmissions, physical uplink control channel transmissions, physical uplink shared channel transmissions, or any combination thereof associated with a transmission and reception point for which the beam failure was detected.

Aspect 15: The method of any of aspects 1 through 14, further comprising: receiving an indication of multiple new beam indicator sets; and selecting the multiple beam failure detection reference signal sets for the monitoring based at least in part on the multiple new beam indicator sets, wherein each of the multiple beam failure detection reference signal sets corresponds to a respective transmission and reception point, a respective control resource set pool, or both.

Aspect 16: An apparatus comprising a memory, transceiver, and at least one processor coupled with the memory and the transceiver, the at least one processor configured to perform a method of any of aspects 1 through 15.

Aspect 17: An apparatus for wireless communications, comprising at least one means for performing a method of any of aspects 1 through 15.

Aspect 18: A non-transitory computer-readable medium storing code for wireless communications at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving an indication of one or more beam failure detection reference signal sets corresponding to a list of component carriers, wherein whether a component carrier is included in the list or whether a beam failure detection reference signal set of the one or more beam failure detection reference signal sets is applicable to the component carrier, or both, is based at least in part on whether the component carrier is of a first type configured for a single beam failure detection reference signal set or is of a second type configured for multiple beam failure detection reference signal sets; and
   monitoring one or more component carriers included in the list for beam failure using the one or more indicated beam failure detection reference signal sets.

2. The method of claim 1, wherein the indication of one or more beam failure detection reference signal sets indicates multiple beam failure detection reference signal sets that correspond to the list of component carriers, the method further comprising:
   identifying, based at least in part on the multiple beam failure detection reference signal sets being indicated by the indication, the multiple beam failure detection reference signal sets as applicable to each component carrier included in the list that is of the second type configured for multiple beam failure detection reference signal sets, wherein:
      the monitoring comprises monitoring each component carrier included in the list that is of the second type using each of the multiple beam failure detection reference signal sets based at least in part on the multiple beam failure detection reference signal sets being applicable to each component carrier included in the list that is of the second type.

3. The method of claim 2, further comprising:
   identifying, based at least in part on the multiple beam failure detection reference signal sets being indicated by the indication, the indication of the multiple beam failure detection reference signal sets as inapplicable to each component carrier included in the list that is of the first type configured for a single beam failure detection reference signal set.

4. The method of claim 1, wherein the indication of one or more beam failure detection reference signal sets indicates a single beam failure detection reference signal set that corresponds to the list of component carriers, the method further comprising:
   identifying, based at least in part on the single beam failure detection reference signal set being indicated by the indication, the single beam failure detection reference signal set as applicable to each component carrier included in the list that is of the first type configured for a single beam failure detection reference signal set, wherein:
      the monitoring comprises monitoring each component carrier included in the list that is of the first type using the single beam failure detection reference signal set based at least in part on the single beam failure detection reference signal set being applicable to each component carrier included in the list that is of the first type.

5. The method of claim 4, further comprising:
   identifying, based at least in part on the single beam failure detection reference signal set being indicated by the indication, the indication of the single beam failure detection reference signal set as inapplicable to each component carrier included in the list that is of the second type configured for multiple beam failure detection reference signal sets.

6. The method of claim 1, wherein the indication of one or more beam failure detection reference signal sets indicates multiple beam failure detection reference signal sets that correspond to the list of component carriers, the method further comprising:
   identifying, based at least in part on the multiple beam failure detection reference signal sets being indicated by the indication, that a first beam failure detection reference signal set of the multiple beam failure detection reference signal sets is applicable to each component carrier of the list of component carriers that is of the first type configured for a single beam failure detection reference signal set, wherein:
      the monitoring comprises monitoring each component carrier included in the list that is of the first type using the first beam failure detection reference signal set based at least in part on the first beam failure detection reference signal set being applicable to each component carrier included in the list that is of the first type.

7. The method of claim 6, further comprising:
   identifying, based at least in part on the multiple beam failure detection reference signal sets being indicated by the indication, that the first beam failure detection reference signal set and a second beam failure detection reference signal set of the multiple beam failure detection reference signal sets are both applicable to each component carrier of the list of component carriers that is of the second type configured for multiple beam failure detection reference signal sets, wherein:
      the monitoring comprises monitoring each component carrier included in the list that is of the second type using both the first beam failure detection reference signal set and the second beam failure detection reference signal set based at least in part on the first beam failure detection reference signal set and the second beam failure detection reference signal set both being applicable to each component carrier included in the list that is of the second type.

8. The method of claim 1, wherein the list comprises only component carriers of the first type configured for the single beam failure detection reference signal set or only component carriers of the second type configured for multiple beam failure detection reference signal sets, the component carriers of the second type that are included in the list each being configured for a same quantity of beam failure detection reference signal sets.

9. The method of claim 1, wherein component carriers that are of the first type comprise component carriers configured for per-cell beam failure recovery, and wherein component carriers of the second type comprise component carriers configured for per-transmission and reception point (TRP) beam failure recovery.

10. The method of claim 1, wherein the list of component carriers comprises a list of component carriers for beam indications.

11. The method of claim 1, further comprising:
receiving a second indication of one or more second beam failure detection reference signal sets corresponding to a second list of component carriers, wherein the second list of component carriers does not include any component carrier that is included in the list of component carriers.

12. The method of claim 1, further comprising:
transmitting a capability message indicating that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

13. The method of claim 1, further comprising:
detecting beam failure within a component carrier of the one or more of the component carriers included in the list based at least in part on the monitoring of the one or more component carriers included in the list for beam failure;
receiving a beam failure recovery response message in response to transmitting a beam failure recovery request; and
resetting one or more power control parameters for uplink transmissions to corresponding default values based at least in part on receiving the beam failure recovery response message.

14. The method of claim 13, wherein the one or more power control parameters for uplink transmissions apply to sounding reference signal transmissions, physical uplink control channel transmissions, physical uplink shared channel transmissions, or any combination thereof associated with a transmission and reception point for which the beam failure was detected.

15. The method of claim 1, further comprising:
receiving an indication of multiple new beam indicator sets; and
selecting the multiple beam failure detection reference signal sets for the monitoring based at least in part on the multiple new beam indicator sets, wherein each of the multiple beam failure detection reference signal sets corresponds to a respective transmission and reception point, a respective control resource set pool, or both.

16. An apparatus for wireless communications, comprising:
memory;
a transceiver; and
at least one processor of a user equipment (UE), the at least one processor coupled with the memory and the transceiver, and the at least one processor configured to:
receive, via the transceiver, an indication of one or more beam failure detection reference signal sets corresponding to a list of component carriers, wherein whether a component carrier is included in the list or whether a beam failure detection reference signal set of the one or more beam failure detection reference signal sets is applicable to the component carrier, or both, is based at least in part on whether the component carrier is of a first type configured for a single beam failure detection reference signal set or is of a second type configured for multiple beam failure detection reference signal sets; and
monitor one or more component carriers included in the list for beam failure using the one or more indicated beam failure detection reference signal sets.

17. The apparatus of claim 16, wherein the indication of one or more beam failure detection reference signal sets indicates multiple beam failure detection reference signal sets that correspond to the list of component carriers, the at least one processor further configured to:
identify, based at least in part on the multiple beam failure detection reference signal sets being indicated by the indication, the multiple beam failure detection reference signal sets as applicable to each component carrier included in the list that is of the second type configured for multiple beam failure detection reference signal sets, wherein:
to monitor the one or more component carriers, the at least one processor is configured to monitor each component carrier included in the list that is of the second type using each of the multiple beam failure detection reference signal sets based at least in part on the multiple beam failure detection reference signal sets being applicable to each component carrier included in the list that is of the second type.

18. The apparatus of claim 17, the at least one processor further configured to:
identify, based at least in part on the multiple beam failure detection reference signal sets being indicated by the indication, the indication of the multiple beam failure detection reference signal sets as inapplicable to each component carrier included in the list that is of the first type configured for a single beam failure detection reference signal set.

19. The apparatus of claim 16, wherein the indication of one or more beam failure detection reference signal sets indicates a single beam failure detection reference signal set that corresponds to the list of component carriers, the at least one processor further configured to:
identify, based at least in part on the single beam failure detection reference signal set being indicated by the indication, the indication of the single beam failure detection reference signal set as inapplicable to each component carrier included in the list that is of the second type configured for multiple beam failure detection reference signal sets, wherein:
to monitor the one or more component carriers, the at least one processor is configured to monitor each component carrier included in the list that is of the first type using the single beam failure detection reference signal set based at least in part on the single beam failure detection reference signal set being applicable to each component carrier included in the list that is of the first type.

20. The apparatus of claim 19, the at least one processor further configured to:
identify, based at least in part on the single beam failure detection reference signal set being indicated by the indication, the indication of the single beam failure detection reference signal set as inapplicable to each component carrier included in the list that is of the second type configured for multiple beam failure detection reference signal sets.

21. The apparatus of claim 16, wherein the indication of one or more beam failure detection reference signal sets indicates multiple beam failure detection reference signal sets that correspond to the list of component carriers, the at least one processor further configured to:
identify, based at least in part on the multiple beam failure detection reference signal sets being indicated by the indication, that a first beam failure detection reference signal set of the multiple beam failure detection reference signal sets is applicable to each component carrier of the list of component carriers that is of the first type configured for a single beam failure detection reference signal set, wherein:
to monitor the one or more component carriers, the at least one processor is configured to monitor each component carrier included in the list that is of the first type using the first beam failure detection reference signal set based at least in part on the first beam failure detection reference signal set being applicable to each component carrier included in the list that is of the first type.

22. The apparatus of claim 21, the at least one processor further configured to:
identify, based at least in part on the multiple beam failure detection reference signal sets being indicated by the indication, that the first beam failure detection reference signal set and a second beam failure detection reference signal set of the multiple beam failure detection reference signal sets are both applicable to each component carrier of the list of component carriers that is of the second type configured for multiple beam failure detection reference signal sets, wherein:
to monitor the one or more component carriers, the at least one processor is configured to monitor each component carrier included in the list that is of the second type using both the first beam failure detection reference signal set and the second beam failure detection reference signal set based at least in part on the first beam failure detection reference signal set and the second beam failure detection reference signal set both being applicable to each component carrier included in the list that is of the second type.

23. The apparatus of claim 16, wherein the list comprises only component carriers of the first type configured for the single beam failure detection reference signal set or only component carriers of the second type configured for multiple beam failure detection reference signal sets, the component carriers of the second type that are included in the list each being configured for a same quantity of beam failure detection reference signal sets.

24. The apparatus of claim 16, wherein the list of component carriers comprises a list of component carriers for beam indications.

25. The apparatus of claim 16, the at least one processor further configured to:
receive, via the transceiver, a second indication of one or more second beam failure detection reference signal sets corresponding to a second list of component carriers, wherein the second list of component carriers does not include any component carrier that is included in the list of component carriers.

26. The apparatus of claim 16, the at least one processor further configured to:
transmit, via the transceiver, a capability message indicating that the UE supports reception of beam failure detection reference signal set indications corresponding to multiple component carriers, a maximum quantity of applicable component carriers for which the UE supports beam failure detection reference signal set indications, a maximum quantity of lists of component carriers for which the UE supports beam failure detection reference signal set indications, or any combination thereof.

27. The apparatus of claim 16, the at least one processor further configured to:
detect beam failure within a component carrier of the one or more of the component carriers included in the list based at least in part on the monitoring of the one or more component carriers included in the list for beam failure;
receive, via the transceiver, a beam failure recovery response message in response to transmission, via the transceiver, of a beam failure recovery request; and
reset one or more power control parameters for uplink transmissions to corresponding default values based at least in part on receiving the beam failure recovery response message.

28. The apparatus of claim 16, the at least one processor further configured to:
receive, via the transceiver, an indication of multiple new beam indicator sets; and
select the multiple beam failure detection reference signal sets for the monitoring based at least in part on the multiple new beam indicator sets, wherein each of the multiple beam failure detection reference signal sets corresponds to a respective transmission and reception point, a respective control resource set pool, or both.

29. An apparatus for wireless communications at a user equipment (UE), comprising:
means for receiving an indication of one or more beam failure detection reference signal sets corresponding to a list of component carriers, wherein whether a component carrier is included in the list or whether a beam failure detection reference signal set of the one or more beam failure detection reference signal sets is applicable to the component carrier, or both, is based at least in part on whether the component carrier is of a first type configured for a single beam failure detection reference signal set or is of a second type configured for multiple beam failure detection reference signal sets; and
means for monitoring one or more component carriers included in the list for beam failure using the one or more indicated beam failure detection reference signal sets.

30. A non-transitory computer-readable medium storing code for wireless communications at a user equipment (UE), the code comprising instructions executable by a processor to:

receive an indication of one or more beam failure detection reference signal sets corresponding to a list of component carriers, wherein whether a component carrier is included in the list or whether a beam failure detection reference signal set of the one or more beam failure detection reference signal sets is applicable to the component carrier, or both, is based at least in part on whether the component carrier is of a first type configured for a single beam failure detection reference signal set or is of a second type configured for multiple beam failure detection reference signal sets; and monitor one or more component carriers included in the list for beam failure using the one or more indicated beam failure detection reference signal sets.

* * * * *